(12) United States Patent
Dussan et al.

(10) Patent No.: US 10,386,467 B2
(45) Date of Patent: Aug. 20, 2019

(54) LADAR PULSE DECONFLICTION APPARATUS

(71) Applicant: AEYE, Inc., Fairview Heights, IL (US)

(72) Inventors: Luis Carlos Dussan, Dublin, CA (US); Allan Steinhardt, Brentwood, CA (US)

(73) Assignee: AEYE, INC., Fairview Heights, IL (US)

( * ) Notice: Subject to any disclaimer, the term of this patent is extended or adjusted under 35 U.S.C. 154(b) by 0 days.

(21) Appl. No.: 15/896,233

(22) Filed: Feb. 14, 2018

(65) Prior Publication Data

US 2018/0238998 A1      Aug. 23, 2018

Related U.S. Application Data

(60) Provisional application No. 62/460,520, filed on Feb. 17, 2017.

(51) Int. Cl.
*G01C 3/08* (2006.01)
*G01S 7/486* (2006.01)
(Continued)

(52) U.S. Cl.
CPC ........... *G01S 7/4861* (2013.01); *G01S 7/006* (2013.01); *G01S 7/484* (2013.01); *G01S 7/487* (2013.01); *G01S 7/4816* (2013.01); *G01S 7/4865* (2013.01); *G01S 7/4873* (2013.01); *G01S 7/4876* (2013.01); *G01S 17/023* (2013.01); *G01S 17/06* (2013.01); *G01S 17/10* (2013.01); *G01S 17/66* (2013.01); *G01S 17/936* (2013.01); *G01S 17/89* (2013.01); *G01S 2013/936* (2013.01)

(58) Field of Classification Search
CPC .............................. G01S 7/4865; G01S 7/484
USPC ......................................................... 356/5.01
See application file for complete search history.

(56) References Cited

U.S. PATENT DOCUMENTS 4,579,430 A    4/1986  Bille
5,552,893 A    9/1996  Akasu
(Continued)

FOREIGN PATENT DOCUMENTS

CN         103885065 A    6/2014
WO         2004034084 A1  4/2004
(Continued)

OTHER PUBLICATIONS

Analog Devices, "Data Sheet AD9680", 98 pages, 2014-2015.
(Continued)

*Primary Examiner* — Mark Hellner
(74) *Attorney, Agent, or Firm* — Thompson Coburn LLP

(57) ABSTRACT

Disclosed herein are a number of example embodiments that employ controllable delays between successive ladar pulses in order to discriminate between "own" ladar pulse reflections and "interfering" ladar pulses reflections by a receiver. Example embodiments include designs where a sparse delay sum circuit is used at the receiver and where a funnel filter is used at the receiver. Also, disclosed are techniques for selecting codes to use for the controllable delays as well as techniques for identifying and tracking interfering ladar pulses and their corresponding delay codes. The use of a ladar system with pulse deconfliction is also disclosed as part of an optical data communication system.

47 Claims, 17 Drawing Sheets

(51) Int. Cl.
| | |
|---|---|
| *G01S 7/487* | (2006.01) |
| *G01S 7/484* | (2006.01) |
| *G01S 17/06* | (2006.01) |
| *G01S 17/66* | (2006.01) |
| *G01S 7/481* | (2006.01) |
| *G01S 17/93* | (2006.01) |
| *G01S 17/02* | (2006.01) |
| *G01S 17/10* | (2006.01) |
| *G01S 7/00* | (2006.01) |
| G01S 17/89 | (2006.01) |
| G01S 13/93 | (2006.01) |

(56) References Cited

U.S. PATENT DOCUMENTS

| | | | |
|---|---|---|---|
| 5,625,644 A | 4/1997 | Myers | |
| 5,638,164 A | 6/1997 | Landau | |
| 5,808,775 A | 9/1998 | Inagaki et al. | |
| 5,815,250 A * | 9/1998 | Thomson et al. | G01S 7/484 356/5.01 |
| 5,831,719 A | 11/1998 | Berg et al. | |
| 6,031,601 A | 2/2000 | McCusker et al. | |
| 6,245,590 B1 | 6/2001 | Wine et al. | |
| 6,288,816 B1 | 9/2001 | Melville et al. | |
| 6,847,462 B1 | 1/2005 | Kacyra et al. | |
| 6,926,227 B1 * | 8/2005 | Young et al. | F41G 7/226 244/3.13 |
| 7,206,063 B2 | 4/2007 | Anderson et al. | |
| 7,236,235 B2 | 6/2007 | Dimsdale | |
| 7,701,558 B2 | 4/2010 | Walsh et al. | |
| 7,800,736 B2 | 9/2010 | Pack et al. | |
| 7,894,044 B1 | 2/2011 | Sullivan | |
| 7,944,548 B2 | 5/2011 | Eaton | |
| 8,072,663 B2 | 12/2011 | O'Neill et al. | |
| 8,081,301 B2 | 12/2011 | Stann et al. | |
| 8,120,754 B2 | 2/2012 | Kaehler | |
| 8,228,579 B2 | 7/2012 | Sourani | |
| 8,427,657 B2 | 4/2013 | Milanovi | |
| 8,635,091 B2 | 1/2014 | Amigo et al. | |
| 8,681,319 B2 | 3/2014 | Tanaka et al. | |
| 8,896,818 B2 | 11/2014 | Walsh et al. | |
| 9,069,061 B1 | 6/2015 | Harwit | |
| 9,085,354 B1 | 7/2015 | Peeters et al. | |
| 9,128,190 B1 | 9/2015 | Ulrich et al. | |
| 9,261,881 B1 | 2/2016 | Ferguson et al. | |
| 9,278,689 B1 | 3/2016 | Delp | |
| 9,285,477 B1 | 3/2016 | Smith et al. | |
| 9,305,219 B2 | 4/2016 | Ramalingam et al. | |
| 9,315,178 B1 | 4/2016 | Ferguson et al. | |
| 9,360,554 B2 | 6/2016 | Retterath et al. | |
| 9,383,753 B1 | 7/2016 | Templeton et al. | |
| 9,437,053 B2 | 9/2016 | Jenkins et al. | |
| 9,575,184 B2 | 2/2017 | Gilliland et al. | |
| 9,885,778 B2 | 2/2018 | Dussan | |
| 9,897,689 B2 | 2/2018 | Dussan | |
| 9,933,513 B2 | 4/2018 | Dussan et al. | |
| 9,958,545 B2 | 5/2018 | Eichenholz et al. | |
| 10,007,001 B1 | 6/2018 | LaChapelle et al. | |
| 10,042,043 B2 | 8/2018 | Dussan | |
| 10,042,159 B2 | 8/2018 | Dussan et al. | |
| 10,073,166 B2 | 9/2018 | Dussan | |
| 10,078,133 B2 | 9/2018 | Dussan | |
| 2003/0122687 A1 | 7/2003 | Trajkovic et al. | |
| 2003/0151542 A1 | 8/2003 | Steinlechner et al. | |
| 2005/0057654 A1 | 3/2005 | Byren | |
| 2006/0007362 A1 | 1/2006 | Lee et al. | |
| 2006/0176468 A1 | 8/2006 | Anderson et al. | |
| 2006/0197936 A1 | 9/2006 | Liebman et al. | |
| 2006/0227315 A1 | 10/2006 | Beller | |
| 2006/0265147 A1 | 11/2006 | Yamaguchi et al. | |
| 2008/0136626 A1 | 6/2008 | Hudson et al. | |
| 2008/0159591 A1 | 7/2008 | Ruedin | |
| 2009/0059201 A1 | 3/2009 | Willner et al. | |
| 2009/0128864 A1 | 5/2009 | Inage | |
| 2009/0292468 A1 | 11/2009 | Wu et al. | |
| 2010/0027602 A1 | 2/2010 | Abshire et al. | |
| 2010/0053715 A1 | 3/2010 | O'Neill et al. | |
| 2011/0066262 A1 | 3/2011 | Kelly et al. | |
| 2011/0149268 A1 | 6/2011 | Marchant et al. | |
| 2011/0149360 A1 | 6/2011 | Sourani | |
| 2011/0153367 A1 | 6/2011 | Amigo et al. | |
| 2011/0260036 A1 | 10/2011 | Baraniuk et al. | |
| 2011/0317147 A1 | 12/2011 | Campbell et al. | |
| 2012/0044093 A1 | 2/2012 | Pala | |
| 2012/0044476 A1 | 2/2012 | Earhart et al. | |
| 2012/0236379 A1 | 9/2012 | da Silva et al. | |
| 2012/0249996 A1 | 10/2012 | Tanaka et al. | |
| 2012/0257186 A1 | 10/2012 | Rieger et al. | |
| 2014/0021354 A1 | 1/2014 | Gagnon et al. | |
| 2014/0078514 A1 | 3/2014 | Zhu | |
| 2014/0211194 A1 | 7/2014 | Pacala et al. | |
| 2014/0291491 A1 | 10/2014 | Shpunt et al. | |
| 2014/0350836 A1 | 11/2014 | Stettner et al. | |
| 2015/0081211 A1 | 3/2015 | Zeng et al. | |
| 2015/0331113 A1 | 11/2015 | Stettner et al. | |
| 2015/0369920 A1 | 12/2015 | Setono et al. | |
| 2015/0378011 A1 | 12/2015 | Owechko | |
| 2015/0378187 A1 | 12/2015 | Heck et al. | |
| 2016/0003946 A1 | 1/2016 | Gilliland et al. | |
| 2016/0047895 A1 | 2/2016 | Dussan | |
| 2016/0047896 A1 | 2/2016 | Dussan | |
| 2016/0047897 A1 | 2/2016 | Dussan | |
| 2016/0047898 A1 | 2/2016 | Dussan | |
| 2016/0047899 A1 | 2/2016 | Dussan | |
| 2016/0047900 A1 | 2/2016 | Dussan | |
| 2016/0047903 A1 | 2/2016 | Dussan | |
| 2016/0274589 A1 | 9/2016 | Templeton et al. | |
| 2016/0293647 A1 | 10/2016 | Lin et al. | |
| 2017/0158239 A1 | 6/2017 | Dhome et al. | |
| 2017/0199280 A1 | 7/2017 | Nazemi et al. | |
| 2017/0205873 A1 | 7/2017 | Shpunt et al. | |
| 2017/0219695 A1 | 8/2017 | Hall et al. | |
| 2017/0234973 A1 | 8/2017 | Axelsson | |
| 2017/0242102 A1 | 8/2017 | Dussan et al. | |
| 2017/0242103 A1 | 8/2017 | Dussan | |
| 2017/0242104 A1 | 8/2017 | Dussan | |
| 2017/0242105 A1 | 8/2017 | Dussan et al. | |
| 2017/0242106 A1 | 8/2017 | Dussan et al. | |
| 2017/0242107 A1 | 8/2017 | Dussan et al. | |
| 2017/0242108 A1 | 8/2017 | Dussan et al. | |
| 2017/0242109 A1 | 8/2017 | Dussan et al. | |
| 2017/0263048 A1 | 9/2017 | Glaser et al. | |
| 2017/0269197 A1 | 9/2017 | Hall et al. | |
| 2017/0269198 A1 | 9/2017 | Hall et al. | |
| 2017/0269209 A1 | 9/2017 | Hall et al. | |
| 2017/0269215 A1 | 9/2017 | Hall et al. | |
| 2017/0307876 A1 | 10/2017 | Dussan et al. | |
| 2018/0031703 A1 * | 2/2018 | Ngai et al. | G01S 17/10 |
| 2018/0143300 A1 | 5/2018 | Dussan | |
| 2018/0143324 A1 | 5/2018 | Keilaf et al. | |
| 2018/0224533 A1 | 8/2018 | Dussan et al. | |
| 2018/0239000 A1 | 8/2018 | Dussan et al. | |
| 2018/0239001 A1 | 8/2018 | Dussan et al. | |
| 2018/0239004 A1 | 8/2018 | Dussan et al. | |
| 2018/0239005 A1 | 8/2018 | Dussan et al. | |

FOREIGN PATENT DOCUMENTS

| | | |
|---|---|---|
| WO | 2006/076474 A1 | 7/2006 |
| WO | 2008008970 A2 | 1/2008 |
| WO | 2016025908 A2 | 2/2016 |
| WO | 2017/143183 A1 | 8/2017 |
| WO | 2017/143217 A1 | 8/2017 |

OTHER PUBLICATIONS

Extended European Search Report for EP Application 15832272.7 dated Mar. 14, 2018.
Howland et al., "Compressive Sensing LIDAR for 3D Imaging", Optical Society of America, May 1-6, 2011, 2 pages.
International Search Report and Written Opinion for PCT/US15/45399 dated Feb. 2, 2016.

(56) References Cited

OTHER PUBLICATIONS

International Search Report and Written Opinion for PCT/US2017/018359 dated Jun. 19, 2017.
International Search Report and Written Opinion for PCT/US2017/018415 dated Jul. 6, 2017.
International Search Report and Written Opinion for PCT/US2018/018179 dated Jun. 26, 2018.
Kessler, "An afocal beam relay for laser XY scanning systems", Proc. of SPIE vol. 8215, 9 pages, 2012.
Kim et al., "Investigation on the occurrence of mutual interference between pulsed terrestrial LIDAR scanners", 2015 IEEE Intelligent Vehicles Symposium (IV), Jun. 28-Jul. 1, 2015, COEX, Seoul, Korea, pp. 437-442.
Maxim Integrated Products, Inc., Tutorial 800, "Design a Low-Jitter Clock for High Speed Data Converters", 8 pages, Jul. 17, 2002.
Moss et al., "Low-cost compact MEMS scanning LADAR system for robotic applications", Proc. of SPIE, 2012, vol. 8379, 837903-1 to 837903-9.
Office Action for U.S. Appl. No. 15/431,096 dated Nov. 14, 2017.
Office Action for U.S. Appl. No. 15/896,233 dated Jun. 22, 2018.
Office Action for U.S. Appl. No. 15/896,241 dated Jun. 21, 2018.
Office Action for U.S. Appl. No. 15/896,254 dated Jun. 27, 2018.
Redmayne et al., "Understanding the Effect of Clock Jitter on High Speed ADCs", Design Note 1013, Linear Technology, 4 pages, 2006.
Rehn, "Optical properties of elliptical reflectors", Opt. Eng. 43(7), pp. 1480-1488, Jul. 2004.
Sharafutdinova et al., "Improved field scanner incorporating parabolic optics. Part 1: Simulation", Applied Optics, vol. 48, No. 22, p. 4389-4396, Aug. 2009.
Notice of Allowance for U.S. Appl. No. 15/896,241 dated Sep. 12, 2018.
Notice of Allowance for U.S. Appl. No. 15/896,254 dated Nov. 23, 2018.

\* cited by examiner $$Pfa = \frac{\sqrt{2}e^{-\frac{T^2}{2}}}{\sqrt{\pi}}$$

$$P_d = \sum_{k,l,m,n}^{\infty} e^{-3\lambda - \frac{\delta^2}{2} - \frac{m^2}{2}} \frac{\lambda^{l+k+m}}{k!l!m!} e^{-\frac{r^2}{2}} \frac{\left(\frac{rwm}{\delta}\right)^{n+1}}{n+1} {}_1F_2\left(\frac{n+1}{2};1,\frac{n+3}{2};\frac{w^2}{4}\right)\bigg|^{r\delta} \cos\left(\frac{2}{\sqrt{r}}\right) r\delta$$

$$P_{leak}(3) \approx \int_{T,}^{\infty,\frac{1}{\lambda_+}} \frac{\cos\left(\frac{2}{\sqrt{r}}\right)}{\lambda_+} \frac{r^2}{\sqrt{2\pi}} e^{-\frac{r^2}{2}\left(1+\mu^2(\lambda_+ - \lambda_+^2)\right)} \frac{\lambda^2}{\lambda_+} I_0(\mu r \lambda \sqrt{2}) dr d\mu$$

$$P_{leak}(\text{double}) \approx \sum_0^{\infty} \frac{\lambda^k \sqrt{2} e^{-\lambda}}{k! 3\sqrt{\pi}} \left(-\frac{1}{2} + \Phi(2k)\right)(T^{1.5} e^{-\frac{(k-T)^2}{2}})$$

Figure 3C

$$\#collisions/\sec \equiv D\# + M\# \approx \frac{2R_m PRF(Df)(Ec) \, k \, \theta_b V_m}{\theta_s}$$

629

| stage | variable | definition or formula |
|---|---|---|
| 601 | f(shot) | Treat shot distribution as spatially uniform across FOV |
| 602 | D# | Define: number of vehicles exposed to direct line of sight pulse collisions/sec |
| 603 | M# | Define: number of vehicles exposed to reflected pulse collisions/sec |
| 604 | d(V) | Use DOT, or other, statistics to define vehicle spacing vs speed |
| 605 | f(v) | Define vehicle position marginal distribution [nominal uniform] |
| 606 | E(vi vj) | Define vehicle correlation [nominal uncorrelated] |
| 607 | d | Set lidar cross range from meridian [nominal 10m] |
| 608 | W | Set lane width [nominal 10m] |
| 609 | k | Set number of lanes [nominal 2] |
| 610 | Rm | Set max laser blinding [nominal 3km] |
| 611 | Rl | Set max laser detection range [nominal 600m] |
| 612 | Ratten | atmospheric attenuation [nominal 0] |
| 613 | scattering | Lambertian |
| 614 | Speed | $V_m$ vector of speeds: [60,50,40 mph] nominal |
| 615 | Density\|speed | [.014,.019,.028]/m/lane nominal |
| 616 | pupil | $\theta_s$ capture area for pulse collision [nominal 1cm] |
| 617 | scan swath | $\theta_b$ nominal [20,40,80 deg.] [min=20deg] |
| 618 | divergence | nominal [2.5,5,10 mrad] |
| 619 | max blinding | atan(3d/Rl), nominal 100mrad |
| 620 | min (blinding) | atan(d/Rl), nominal 3mrad |
| 621 | bifurcation | atan(3d/Rm), 10 mrad |
| 622 | Df * | effective cloud duty factor, nominal .2, see 28 |
| 623 | Prf | effective average pulse rep frequency, 50k |
| 624 | Ec * | range idling ave eclipsing rng, 2Rl Prf/c, 10 |
| 625 | Area lane * | ~ nominal, flat earth, (Rl-Rm)kW |
| 626 | δ collision rate * | Df Ec PRF = Df c/2Rl |
| 627 | number of beams in swath/car | nominal: 120 |
| 628 | %time in search | nominal: 20% |

Figure 6B

| |
|---|
| Gather statistics on road useage (e.g. from department of transportation) |
| Identify cellular regions which present viable hash codes for figure 4 |
| Distribute these regions as a factory setting |
| Update as required, based on DOT findings, cellular traffic density data etc |
| compare GPS or other own car location aware services induced location to cell cites |
| when entering a new cell cite surrender selected hash code and repeat procedure in figure 4 |

Figure 7

| | |
|---|---|
| inititation | direct vehicle pair communications established (ex: DSRC protocols) |
| code sharing | paired vehicles exchange codes |
| code compilation | each vehicle aggregates codes from all vehicles it contacts over time |
| share compilation | share aggregate across network when bandwidth allows |
| hash code adjustment | use V2V aggregated data to spot free hash code, and or adjust code length |

Figure 8

| |
|---|
| Download and store a library of billboard locations and prior to or during transit. This library can be crowd sourced similar to opensignal.com for wifi hotspots. |
| Download time stamps for each billboard. The time stamps are intervals (in the order of milliseconds) are windows during which the billboards are open for business, i.e. When conversations are scheduled. |
| During the time interval all lidars seeking to read or write messages seize imaging lidar operations and slew to the billboard. |
| Each lidar chooses a two or longer pulse code (i.e. Delay time offset) to use as a carrier to transmit data. |
| Each lidar initiates messaging using pulse code modulation (or variants) |
| Each lidar transmits a message, hashcodes, position, information on other vehicles etc. |
| Each lidar stores and records all message pulses from the billboard. |
| At the end of time stamp interval all lidars resume imaging operations. |
| Each lidar adjusts recieved pulse time stamp based on own-car displacement to build range ellipses to other vehicles. This assists in assigning codes to vehicles after imaging resumes, as well as removing pulse division jitter. |
| Each lidar runs matched filters against dual or longer pulse codes to recover messages. |

Figure 9

| item | min speed(MHz) | bits | slices | comment |
|---|---|---|---|---|
| ADC input | 800 | 1 | 8 | 8 LVDS pairs, 6.4Gbps tranceiver |
| SERDES unpacking,ping pong | 800 | 8 | 16 | parallel to serial conversion |
| 800 block 11 round robin | 80 | 16 | 11 | 10% overlap low latency |
| ping pong swapped robin | 80 | 16 | 11 | avoid simultaneous read write |
| sparse delay sum | 80 | 16 | 11 | Using Xilinx Vertex DSP48E1 w.pre-add |
| Comparator | 80 | 16 | 11 | Initial threshold is used to cull blocks 10x |
| Decimate 11:1, copy | 40 | 16 | 1 | perserve entire block for analysis/CFAR |
| funnel filter | 40 | 16 | 2 | 10x operations per sample |

Figure 10

Initiate: $\text{Heat}\{0\} = \begin{bmatrix} 0 & 0 \\ 0 & 0 \end{bmatrix}$, initiate maximum dosage, md=20

Loop over all shots

-at time K we have $\text{Heat}\{K\} = \begin{bmatrix} 12 & 9 \\ 10 & 6 \end{bmatrix}$ inspect K-th scheduled shot, and energy [example row 2 column 1, energy=8]

-if {energy +Heat(2,1)>md} reduce shot energy, or delay shot else fire

-update heat map: $\text{Heat}\{K\} = \text{Heat}\{K-1\} + \begin{bmatrix} 0 & 0 \\ 8 & 0 \end{bmatrix}$.

Figure 14A

$$\text{Heat}\{K\} = \text{Heat}\{K-1\} + \begin{bmatrix} 0 & 0 \\ 8 & 0 \end{bmatrix} - \text{Heat}\{K-m\}.$$

Figure 14B

LADAR PULSE DECONFLICTION APPARATUS

CROSS-REFERENCE AND PRIORITY CLAIM TO RELATED PATENT APPLICATIONS

This patent application claims priority to provisional U.S. patent application Ser. No. 62/460,520, filed Feb. 17, 2017, and entitled "Method and System for Ladar Pulse Deconfliction", the entire disclosure of which is incorporated herein by reference.

This patent application is related to (1) U.S. patent application Ser. No. 15/896,219, filed this same day, and entitled "Ladar Pulse Deconfliction Method", (2) U.S. patent application Ser. No. 15/896,241, filed this same day, and entitled "Method and System for Ladar Pulse Deconfliction Using Delay Code Selection", (3) U.S. patent application Ser. No. 15/896,254, filed this same day, and entitled "Method and System for Ladar Pulse Deconfliction to Detect and Track Other Ladar Systems", and (4) U.S. patent application Ser. No. 15/896,262, filed this same day, and entitled "Method and System for Optical Data Communication via Scanning Ladar", the entire disclosures of each of which are incorporated herein by reference.

INTRODUCTION

It is believed that there are great needs in the art for improved computer vision technology, particularly in an area such as automobile computer vision. However, these needs are not limited to the automobile computer vision market as the desire for improved computer vision technology is ubiquitous across a wide variety of fields, including but not limited to autonomous platform vision (e.g., autonomous vehicles for air, land (including underground), water (including underwater), and space, such as autonomous land-based vehicles, autonomous aerial vehicles, etc.), surveillance (e.g., border security, aerial drone monitoring, etc.), mapping (e.g., mapping of sub-surface tunnels, mapping via aerial drones, etc.), target recognition applications, remote sensing, safety alerting (e.g., for drivers), and the like).

As used herein, the term "ladar" refers to and encompasses any of laser radar, laser detection and ranging, and light detection and ranging ("lidar"). Ladar is a technology widely used in connection with computer vision. In an exemplary ladar system, a transmitter that includes a laser source transmits a laser output such as a ladar pulse into a nearby environment. Then, a ladar receiver will receive a reflection of this laser output from an object in the nearby environment, and the ladar receiver will process the received reflection to determine a distance to such an object (range information). Based on this range information, a clearer understanding of the environment's geometry can be obtained by a host processor wishing to compute things such as path planning in obstacle avoidance scenarios, way point determination, etc.

However, as ladar usage grows, particularly in fields such as automobile vision, the global presence of millions and potentially billions of ladar systems in the field poses a daunting technical challenge: how can the ladar systems be designed to differentiate their own ladar returns from those of other ladar systems? For example, it can be expected in automobile use cases that traffic patterns will often involve many ladar systems transmitting ladar pulses in close proximity to each other. This will result in a ladar receiver of a given ladar system receiving a light signal that may include not only the ladar pulse reflection from that ladar system's ladar transmitter (its "own" pulse), but also ladar pulses and ladar reflections from the ladar transmitters of other ladar systems ("interfering" pulses). Thus, it should be understood that ladar receivers will detect noisy light signals, and there is a need for technology that is capable of distinguishing between "own" pulse reflections and "interfering" pulses/pulse reflections within this noisy signal while operating in real-time in the field.

As a solution to this technical challenge, the inventors disclose that the ladar transmitters can be designed to encode their own ladar pulses via a delay between successive ladar pulses. Thus, different ladar transmitters can employ different delays between successive ladar pulses to allow ladar receivers to distinguish between "own" ladar pulses and "interfering" ladar pulses. Preferably, these delays are fairly short time intervals and the number of pulses in the pulse sequence is kept low so as to keep the square root loss in effective energy low. Accordingly, the encoding can be referred to as a sparse burst code. For example, in an example embodiment, the pulse sequence can be a pulse pair (doublet) such that a single delay between pulses is used to distinguish "own" pulses from "interfering" pulses. In another example embodiment, the pulse sequence can be three pulses (triplet) such that two delays are used for encoding. In general, it should be understood that for a sequence of n pulses (n-tuple), there would be n−1 delays that can be used for encoding. Another benefit of the sparse burst code is that the number of samples needed to represent the pulses can be low, which contributes to computational efficiency and low latency processing.

Also, in various example embodiments, the ladar receiver system can decode the received delay-encoded pulses without the need for cooperation or communication with outside systems which is advantageous in situations where such communication may not always be possible or available. Further still, the pulse decoding process for the delay-encoded pulses can be efficiently implemented by the receiver system such that the ladar system can still operate at desired speeds.

A delay sum circuit can be employed to detect the presence of "own" pulse reflections within a received ladar signal. In an example embodiment, the delay sum circuit can perform coarse-grained pulse detection. In another example embodiment, the delay sum circuit can be augmented with additional comparators to perform fine-grained pulse detection.

A variety of techniques are described herein that can be used to select the delays used by a universe of ladar systems so as to reduce the likelihood of undesired pulse collisions where two ladar systems employ the same delays between pulses.

The inventors also disclose that the pulse deconfliction techniques described herein can also be used to detect and track the existence of other ladar systems in an environment that employ different delay codes between ladar pulses.

Further still, the inventors disclose various optical data communication techniques that leverage the scanning ladar system to send and receive message data via encoded ladar pulses. Furthermore, laser dosage tracking as described herein can be employed to reduce the risks of overly exposing humans and cameras to excessive laser light.

These and other features and advantages of the present invention will be described hereinafter to those having ordinary skill in the art.

BRIEF DESCRIPTION OF THE DRAWINGS

FIG. 3C shows formulas that can be used to measure various detection metrics.

FIGS. 6A and 6B show an example performance model for vehicle usage scenarios.

FIG. 7 shows an example process flow for using position detection to influence delay code selection.

FIG. 8 shows an example process flow for using vehicle-to-vehicle communications to collaboratively define delay codes.

FIG. 9 shows an example process flow for using billboard techniques to define delay codes.

FIG. 10 shows an example pulse deconfliction data flow for a case of 8 bits, 800 MHz ADC, with a triple pulse code, with maximum code delay length of 80 nsec.

FIGS. 14A and 14B show example embodiments of a laser heat map control loop.

DETAILED DESCRIPTION OF EXAMPLE EMBODIMENTS

Figure 1:
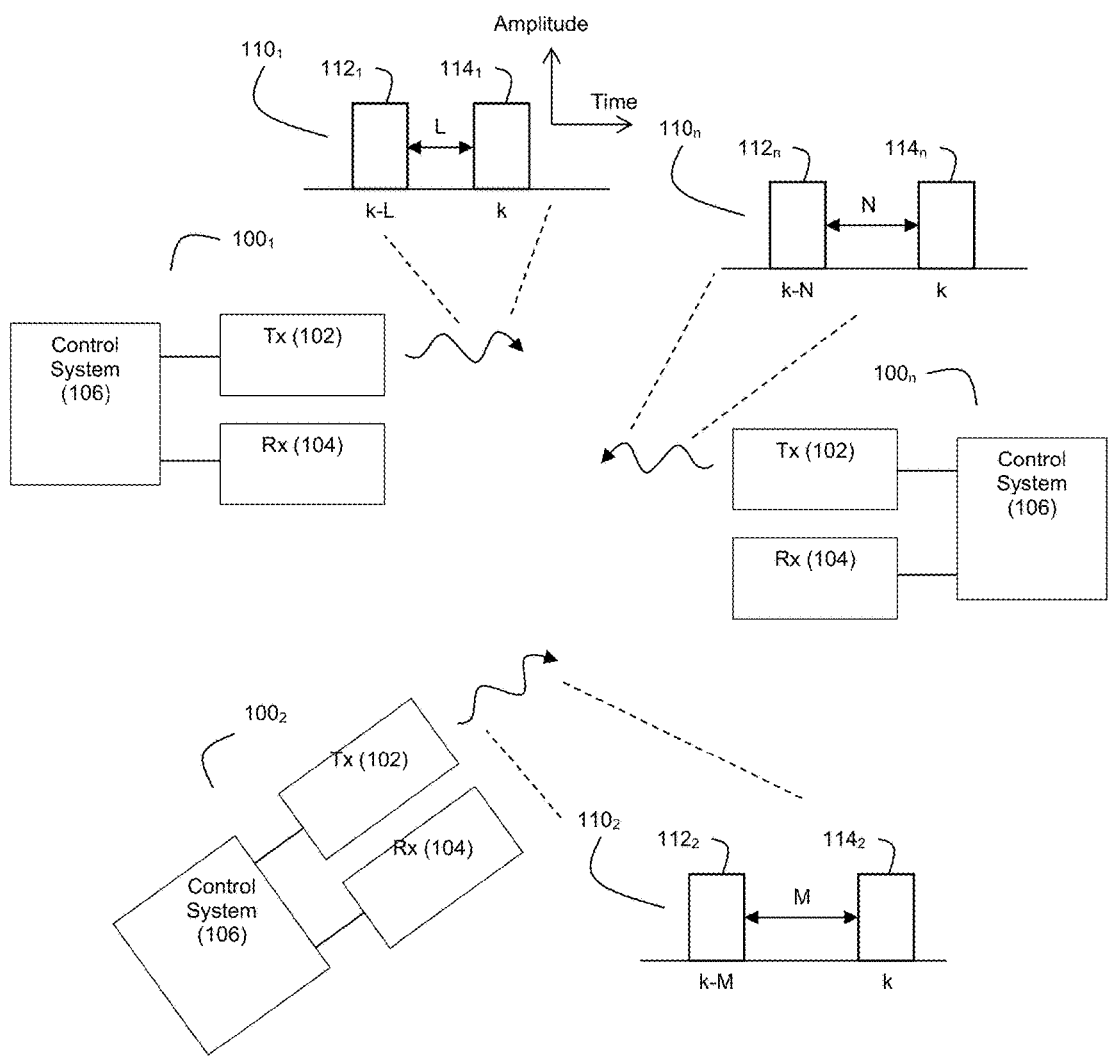
FIG. 1 discloses an example environment where multiple ladar systems may pose interference threats to each other.

FIG. 1 depicts an example environment where there are multiple ladar systems 100 (e.g., $100_1$, $100_2$, ... $100n$) that transmit ladar pulses. Each ladar system 100 comprises a ladar transmitter 102, a ladar receiver 104, and a control system 106. Each ladar transmitter 102 is configured to generate and transmit ladar pulses into the environment. Each ladar receiver 104 is configured to receive and detect a light signal that may include ladar pulse reflections. As noted above, this received signal may also include noise such as interfering pulses/pulse reflections from other ladar systems. Each control system 106 can be configured to control how its corresponding ladar transmitter 102 and ladar receiver 104 operate. Examples of suitable ladar systems 100 are disclosed and described in greater detail in U.S. patent application Ser. No. 62/038,065, filed Aug. 15, 2014; and U.S. Pat. App. Pubs. 2016/0047895, 2016/0047896, 2016/0047897, 2016/0047898, 2016/0047899, 2016/0047903, 2016/0047900, 2017/0242102, 2017/0242103, 2017/0242104, 2017/0242105, 2017/0242106, 2017/0242107, and 2017/0242109, the entire disclosures of which are incorporated herein by reference. For example, the ladar system 100 may employ a ladar transmitter 102 (as described in the above-referenced and incorporated patent applications) that includes scanning mirrors and uses a range point down selection algorithm to support pre-scan compression (which can be referred herein to as "compressive sensing"). Such an embodiment may also include an environmental sensing system 120 that provides environmental scene data to the ladar transmitter to support the range point down selection. Through the use of pre-scan compression, such a ladar transmitter can better manage bandwidth through intelligent range point target selection. Furthermore, because the detection and image quality for a ladar system varies as the square root of the number of pulses used per point cloud, this means that reducing the required number of communication pulses via the compressive sensing enhances the signal to noise ratio (SNR), enabling robust pulse collision avoidance without greatly reducing detection range or position accuracy. Accordingly, the pulse deconfliction techniques described herein are particularly beneficial when combined with a ladar transmitter that employs compressive sensing. While these referenced and incorporated patent applications describe example embodiments for ladar systems 100, it should nevertheless be understood that practitioners may choose to implement the ladar systems 100 differently than as disclosed in these referenced and incorporated patent applications.

The ladar systems can distinguish between each other's pulses based on the delays that are present between successive ladar pulses transmitted by each ladar transmitter 102. Thus, the ladar transmitter 102 for ladar system $100_1$ can generate a pulse sequence $110_1$ with a delay of L between pulses $112_1$ and $114_1$. The ladar transmitter 102 for ladar system $100_2$ can generate a pulse sequence $110_2$ with a delay of M between pulses $112_2$ and $114_2$, and so on (including ladar transmitter 102 for ladar system $100_n$ generating a pulse sequence $110_n$ with a delay of N between pulses $112_n$ and $114_n$). It should be understood that L, M, and N are all different values to support pulse differentiation by the ladar systems 100. Also, while the example of FIG. 1 shows that the various pulse sequences 110 are doublets, it should be understood that longer pulses sequences could be used if desired by a practitioner (e.g., a n-tuple pulse sequence where each pulse sequence includes n−1 delays).

Figure 2A:
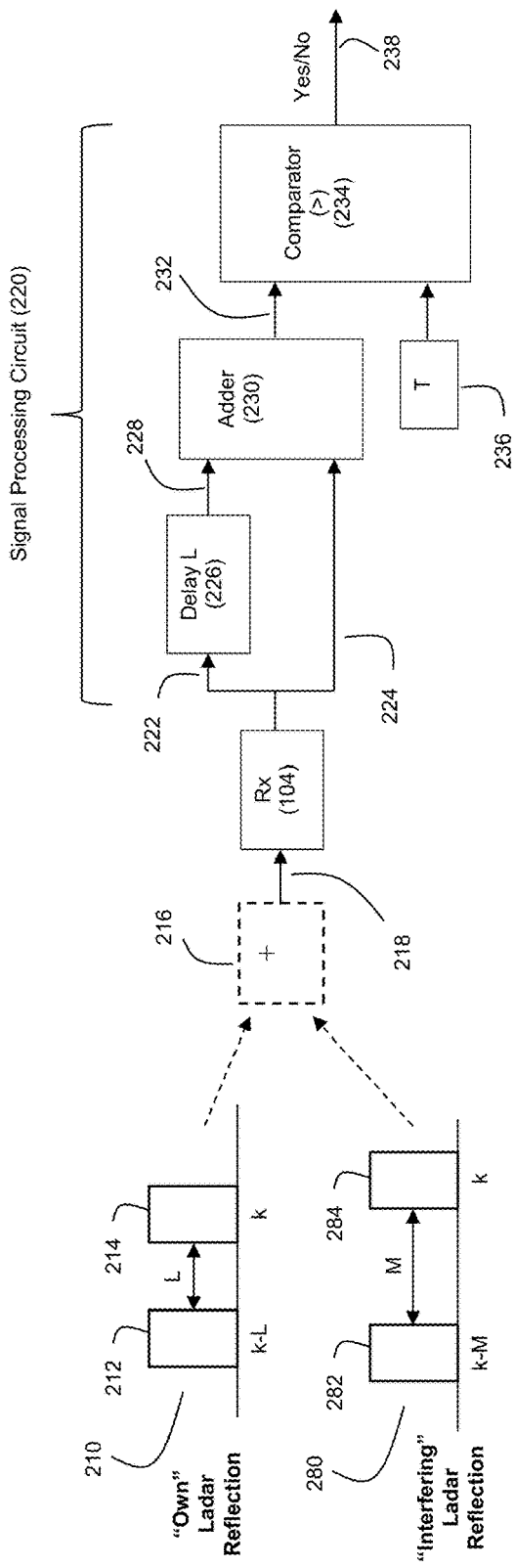
FIG. 2A depicts an example signal processing circuit that can be used for doublet pulse deconfliction to decode an incoming signal and detect the presence of any "own" pulse reflections using sparse summation.

FIG. 2A depicts an example signal processing circuit 220 that can be used on the ladar system 100's receive side to decode an incoming signal to detect the presence of any "own" pulse reflections. The "own" ladar pulse transmitted by the subject ladar system 100 can be expected to largely retain the delay L between its pulses when it strikes an object in the environment and is reflected back to the receiver 104. However, as indicated above, the signal sensed by receiver 104 will also include noise such as interfering ladar pulses and interfering pulse reflections. For ease of illustration, FIG. 2A shows the presence of both an "own" ladar pulse reflection 210 and an "interfering" ladar pulse reflection 280, each with its own delay between pulses (where the "own"

ladar pulse reflection 210 includes a delay of L between pulses 212 and 214 while the "interfering" ladar pulse reflection 280 includes a delay of M between pulses 282 and 284).

The signal processing circuit 220 can be referred to as a "sparse delay sum circuit". The signal processing circuit 220 provides coarse filtration while simultaneously creating pulse collision excision and recombining n-tuples (e.g., doublets) for subsequent point cloud formation. This arrangement allows for in-stride collision removal and helps support an inspection of every single sample of the signal sensed by the receiver's photodetector for an arbitrary number of interfering ladar systems (e.g., other vehicles) in view of the "own" ladar system. Only n−1 delays are needed to uniquely determine an n-tuple code. The signal processing circuit 220 does not rely on intensity or individual pulse shape and is hence robust to attenuation and pulse spreading.

The summation indicated by 216 in FIG. 2A represents the effect of physics and occurs "in the air" as the electromagnetic waves from the incoming ladar pulse reflections 210 and 280 commingle with each other. Thus, the light 218 sensed by receiver 104 is a commingling of ladar pulse reflections 210 and 280 as well as other sources of light noise. Receiver 104 includes a light sensor such as a photodetector. Receiver 104 may also include features such as an optical front end and an analog-to-digital converter (ADC), although this need not be the case. An example embodiment of suitable receiver technology for use as receiver 104 is described in the above-referenced and incorporated U.S. Pat. App. Pub. 2017/0242105. The receiver 104 will thus sense incoming light 218 and generate a signal representative of the sensed light (which includes signal portions attributable to "own" ladar pulse reflection 210 and the interfering ladar pulse reflection 280). In an example embodiment where the receiver 104 includes an ADC, the sensed light signal produced within the receiver can be represented by a plurality of digital samples.

In the example embodiment of FIG. 2A, these samples are passed into two channels 222 and 224. Channel 222 includes a delay circuit 226 that is configured to impose a delay of L on the samples, where L is the value known by the system as the delay code for an "own" ladar pulse. The output of the delay circuit 226 will be a signal 228 that is a delayed version (by L samples) of the signal entering channel 222. The delay circuit 226 can be embodied in any form suitable for delaying the signal coming into channel 222 by L, whether in hardware, firmware, software, combinations thereof or achieved electronically, optically, acoustically, and/or magnetically. In a digital embodiment where the time delay L between pulses can be represented by a count of samples, L can be the number of samples that would represent the time delay between pulses 212 and 214.

Channel 224 passes the unaltered samples from the receiver 104 to adder circuit 230. Adder circuit adds the delayed signal 228 with the undelayed signal in channel 224. Signal 232 that is output by adder circuit 230 thus represents the summation of the undelayed signal from the receiver and its delayed counterpart. In the absence of any noise within the signal from the receiver, it should be understood that the adder output signal 232 will exhibit a peak value when the second pulse 214 of the "own" ladar pulse reflection 210 is received and processed by the signal processing circuit 220. Accordingly, this peak would identify when a valid "own" pulse reflection is received. However, the presence of noise within the signals will tend to obscure such peaks.

To provide a coarse filter for detecting own ladar pulse reflections within the noise-impacted signal from the receiver, comparator circuit 234 can be used. Comparator 234 compares the adder output signal 232 with a value T. If signal 232 is greater than T, the signal can be deemed as likely including the "own" pulse reflection 210. If the signal 232 is less than T, the signal can be deemed as likely not including the "own" pulse reflection 210. The value of T can be a statistical characterization of a floor above which the signal would likely contain the "own" pulse reflection 210 (derived from the observation above that signal 232 will tend to exhibit peak values when the "own" pulse reflection is present). The value of T can be fed into comparator 234 from a register 236. The output of comparator 234 can be a signal 238 that is indicative of whether the signal from the receiver likely includes the "own" pulse reflection 210. By way of example, this signal 238 could be a binary yes/no flag to that effect.

Figure 2B:
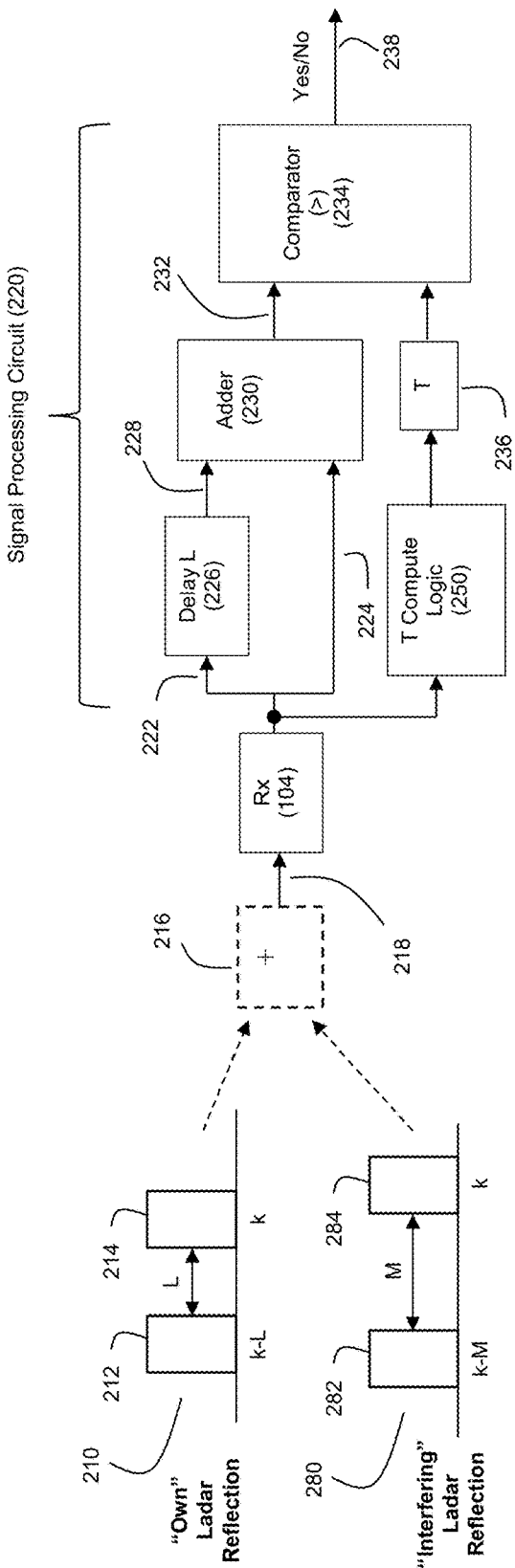
FIG. 2B shows another example embodiment of a signal processing circuit that can be used for doublet pulse deconfliction using sparse summation with data adaptive thresholding.

FIG. 2B depicts an example embodiment of signal processing circuit 220 where the circuit 220 includes T compute logic 250. This compute logic 250 can be configured to compute a value for T based on the signal from the receiver. Accordingly, as the characteristics of the received signal change, the value for T may adaptively change. This feature is useful when the noise "floor" is comprised of ambient light (e.g., during daytime), other ladar light, and/or other external sources. When the system is known to be limited by a noise floor that is mere thermal noise, the nonadaptive threshold in FIG. 2A is preferred. Compute logic 250 can compute a moving average of the samples output from the receiver and passing into channels 222 and 224. This can be a running average with any chosen sliding window size. A subset of the samples can be used (trickle moving average) to cut down on computations:

1) Take the summation of the squares of the past J samples.
2) If any past samples have been declared "valid" pulses, remove these D terms from the sum.
3) Divide this summation by the number of samples remaining in the sum after subtraction and denote the result by Q.
4) Set $T=\alpha/\sqrt{Q}$, where $\alpha$ is the desired number of standard deviations.

While FIGS. 2A and 2B show examples where the pulse coding uses one delay (a doublet pulse), it should be understood that if the pulse coding uses multiple delays, the signal processing circuit 220 can accommodate this through additional taps in the delay line and cascaded adders. Such an approach can be referred to as a "cascaded sparse delay sum circuit".

Figure 2C:
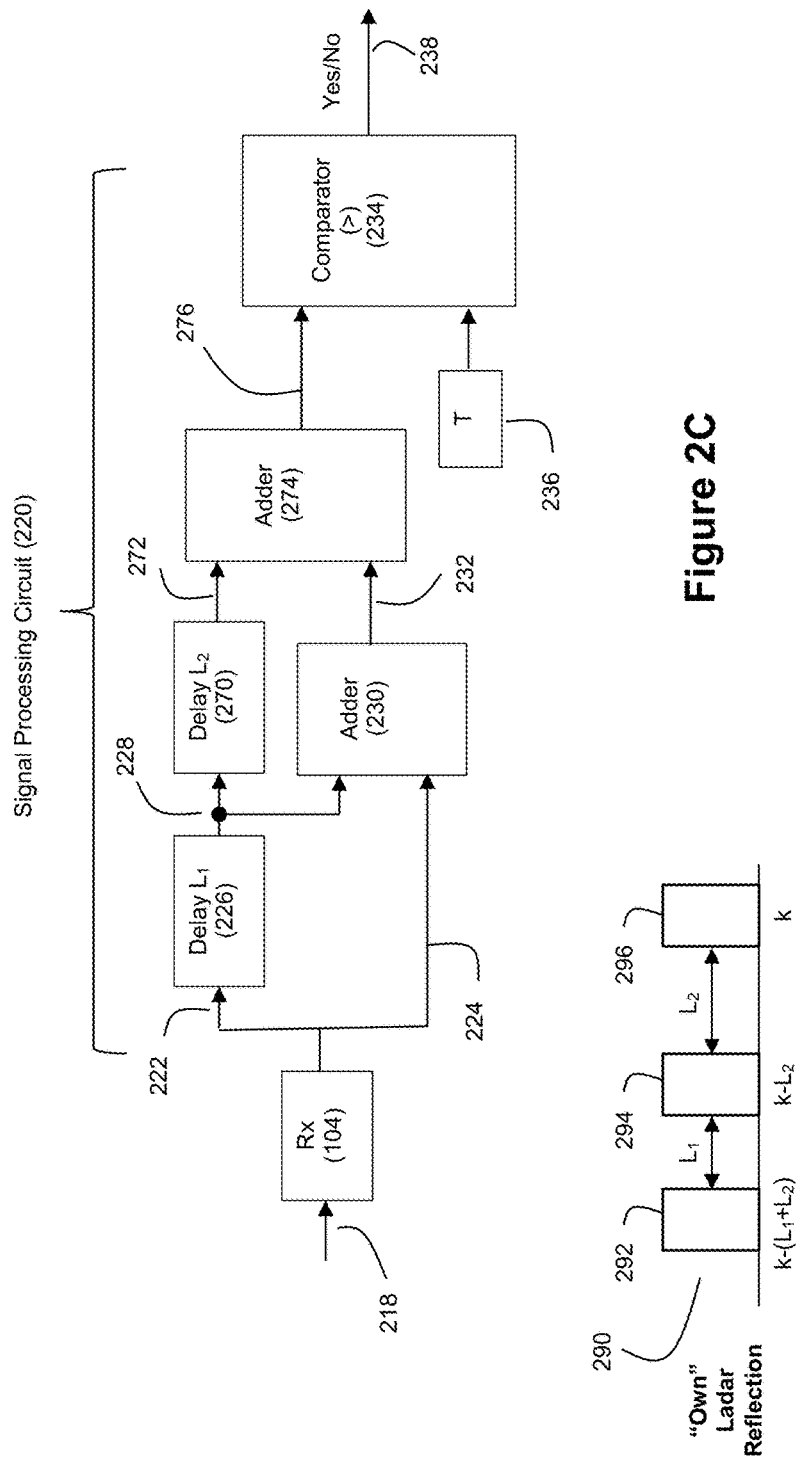
FIG. 2C shows an example embodiment of a signal processing circuit that can be used for triplet pulse deconfliction using sparse summation.

For example, FIG. 2C shows an example embodiment where the "own" ladar pulse is a triplet pulse 290 that includes two delays, $L_1$ between pulses 292 and 294 and $L_2$ between pulses 294 and 296. With this arrangement, channel 222 includes two delay circuits 226 and 270. Delay circuit 226 can operate as described above in connection with FIG. 2A to impose a delay of $L_1$ on the incoming samples. Delay circuit 270 then operates to delay the delayed signal 228 with a delay of $L_2$ to create another delayed signal 272 that delays the incoming samples at 222 by $L_1$ and $L_2$.

The cascaded adders comprise an adder 230 that taps into delayed signal 228 to sum delayed signal 228 with the undelayed signal in channel 224, where the output 232 from adder 230 is fed into a downstream adder circuit 274 that taps into delayed signal 272 for summing with adder output signal 232 to yield adder output signal 276.

Comparator 234 then compares adder output signal 276 with T to generate signal 238 as discussed above. As explained in connection with FIG. 2B, the value of T can be computed using T compute logic 250 (as shown by FIG. 2B) based on the signal from the receiver.

The triplet pulse encoding involved in FIG. 2B also helps solve a challenge during operation that may arise as a result of multipath diffusion from interfering ladar pulses/pulse reflections. To mitigate this challenge, the extra pulse and delay in the triplet yields a third code index that forms a triplet sparse aperture code, reducing the risk of falsely accepting a spurious pulse in the (unlikely but possible) event that the received spurious signal matched a two-pulse code configuration. The triplet sparse aperture code also mitigates clock jitter-induced spurious pulse collisions. For example, suppose the triplet code delays for the "own" ladar pulse are 3,19 (which yields a signal in the form of y(k), y(k−3), and y(k−19)). Now further suppose that the spurious, interfering pulse presents a return over the range [y(k),y(k−3)]. In this situation, a doublet detector may declare the code valid, which constitutes a false positive. By adding a third term, the odds of triggering [exceeding the threshold T] in the triple sum (vice double sum) from a single bounce path is very low. Furthermore, a three-pulse [triplet] code presents the practitioner with $$\frac{n(n-1)}{2} \approx \frac{n^2}{2}$$

codes (where n is the maximum delay). So, for an example where n=60, this provides about 12 bits of isolation. Therefore, a triplet code enhances isolation against interfering ladars.

Figure 2D:
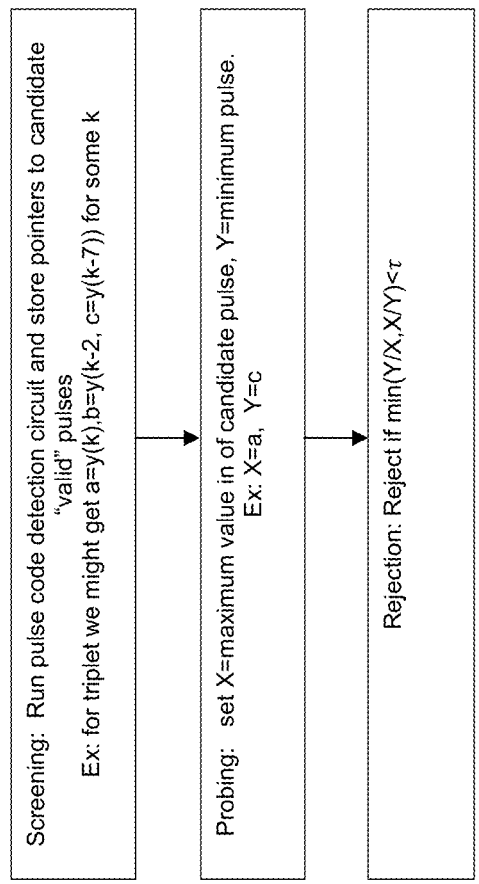
FIG. 2D shows an example process flow for enhanced deconfliction using a triple comparator, which can be applied to delay code(s) of any length.

While the circuit FIG. 2C operates effectively, the inventors expect that even better performance can be obtained by using a funnel filter approach as described herein. Such an approach is expected to mitigate both multipath and mitigating pulse collisions from interfering ladars, for doublet, triplet, or any n-tuple code. FIG. 2D shows an example process flow for the logic flow of the funnel filter. We use $N_{tuple}$ to denote code length for clarity. We first screen by using the simple sum and threshold process of FIGS. 2B, 2C (or the extension to $N_{tuple}>2$, to screen for candidate codes). Consider the doublet case and denote these two samples as x,y, with x the largest of the two. We accept the candidate code when the following three conditions are satisfied, for some fixed $\tau>1$:

$$x+y>T \quad\quad\quad 1)$$

$$x<\tau y \quad\quad\quad 2)$$

$$y<\tau x \quad\quad\quad 3)$$

Note that 2),3) combined is the same as computing max(x/y,y/x)<$\tau$ (see discussion below relating to a triple comparator approach).

Therefore the above three steps align with FIG. 2D, with 1) being screening in FIG. 2D, and probing/rejection in FIG. 2D being implemented by 2),3). The reason we choose not to explicitly form the maximum is because it is faster to evaluate 2),3). For a doublet pulse it is also easier to find the detection statistics, as described in FIG. 4. However, it should be noted that, for more than two pulses, we can explicitly form a maximum and minimum. The probe step 1), is the sparse sum from FIGS. 2B, 2C. Clearly, more energy is an indicator of valid code presence. As to the value of T to be chosen, suppose the presence of a code returns a value $S+N_{oise}$, and noise only returns a value of $N_{oise}$. Then we should pick a value of T so that $S+N_{oise}>T>N_{oise}$. Further the choice of T in this interval will allow us to trade false alarms and detection probability as discussed in FIG. 4.

Step 2),3) are motivated and justified as follows. Suppose we had no noise and so x=y=S. Then a value of $\tau=1$ allows a true pulse to pass, but any noise will cause the filter to reject that sample. So, as we make $\tau$ larger, we increase the detection probability when noise is present at the expense of more false alarms. Using the same argument, we see that the other threshold T should be chosen so that $N_{oise}<T<2S$.

Figure 3A:
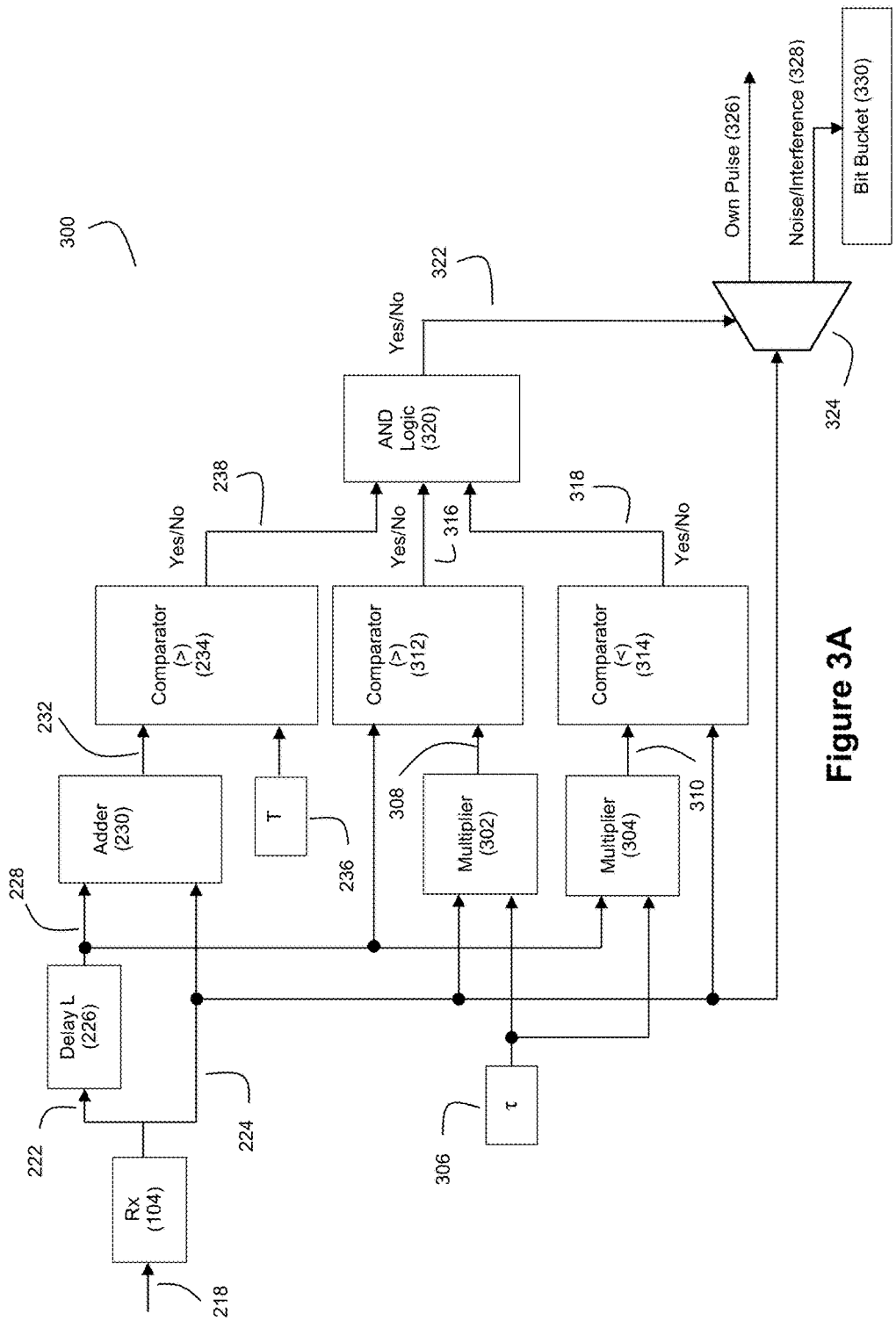
FIG. 3A depicts an example signal processing circuit that can be used for doublet pulse deconfliction to decode an incoming signal and detect the presence of any "own" pulse reflections using the triple comparator scheme in 2D for fine-grained detection.

FIG. 3A shows a signal processing circuit 300 that includes signal processing circuit 220 of FIG. 2A [which can perform step 1) from above] with additional filtration circuitry, mainly the probe stage [which can perform steps 2),3) from above], which can take the form of two more comparisons. Note that in the triple comparator, one comparison is with the threshold T and the other two with $\tau$. With the augmentation of FIG. 3A, the own pulse detection is now based on a triple comparator. The triple comparator arrangement provides a nonlinear decision region which provides more fine-grained preservation of valid "own" ladar pulse reflections while rejecting interfering pulses/pulse reflections. Comparator 234 operates as described above in connection with FIG. 2A. However, multiplier 302 taps into the signal in channel 224 and multiplies this signal by the value $\tau$ to produce a first product signal 308. Also, multiplier 304 taps into the delayed signal 222 and multiplies this delayed signal by $\tau$ to produce a second product signal 310. The value of $\tau$ can be fed into multipliers 302 and 304 from a register 306.

Comparator 312 compares the delayed signal 228 with the first product signal 308. If the delayed signal 228 is less than the first product signal 308, this indicates that the two pulses x,y differ substantially, and the output signal 316 from comparator 312 can indicate that it is deemed unlikely that the own ladar pulse reflection 210 is present in the signal.

Comparator 314 compares the undelayed signal in channel 224 with the second product signal 310. If the undelayed signal at 224 exceeds the second product signal 310, this again indicates that x,y differ significantly, which cannot occur for a valid pulse present on both channels, and the output signal 318 from comparator 314 can indicate that it is deemed unlikely that the own ladar pulse reflection 210 is present in the signal.

The circuit 300 can also include AND logic 320 downstream from comparators 234, 312, and 314. AND logic 320 will operate to go high when all of the outputs 238, 316, and 318 from comparators 234, 312 and 314 are high. A high (yes) signal at AND output 322 will indicate that the fine-grained filter has detected the presence of the "own" ladar pulse reflection within the signal. A signal that passes the tests imposed by the three comparators 234, 312 and 314 will enjoy two attributes, namely (1) the sum of candidate pulse pairs will be large (by virtue of the decision by comparator 234), and (2) the inter-pulse deviation will be small. If any of the outputs 238, 316, and 318 from comparators 234, 312 and 314 are low, the output signal 322 from AND logic 320 will indicate that the "own" ladar pulse reflection is not present within the signal from the receiver.

FIG. 3A also shows a selector circuit 324 that uses signal 322 to classify a sliding window of the signal samples as either an "own" pulse reflection 326 or noise/interference 328. Samples classified as an "own" pulse reflection 326 by signal 322 can be further processed to extract range information while samples classified as noise/interference 328 by signal 322 can be dropped into a bit bucket 330 and/or otherwise processed to gain additional information about the noise/interference.

The triple comparator filter of FIG. 3A can be implemented using only a few logic gates, additions, and multiplications which makes it amenable to low latency pulse detection. Furthermore, it should be understood that a practitioner might choose implementations other than that shown by FIG. 3A. For example, the multipliers 302 and 304 could be replaced with a table using distributed arithmetic.

Figure 3B:
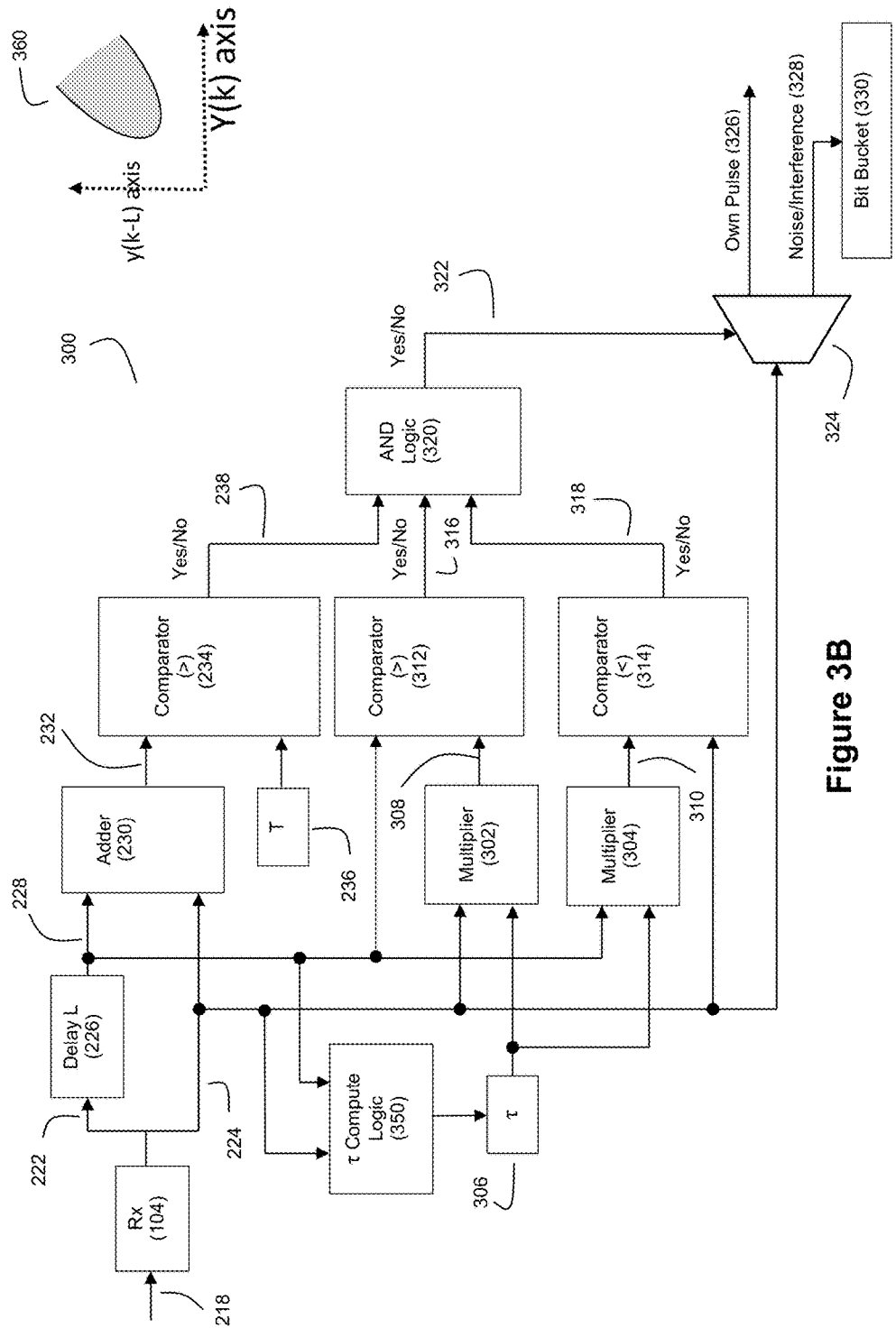
FIG. 3B shows another example embodiment of a signal processing circuit that can be used for fine-grained doublet pulse deconfliction. This embodiment expands on FIG. 3A by adding a data adaptive threshold. Because of the shape of the decision region we call this a funnel filter.

FIG. 3B depicts an example embodiment where the circuit 300 includes compute logic 350 to adapt τ, which leads to what the funnel filter arrangement discussed above. It should be understood that T compute logic 250 may also be present. The τ compute logic 350 can be configured to compute a value for τ based on the delayed and undelayed signals from receiver (see 228 and 224). Accordingly, as the characteristics of the received signal change, the value for τ may adaptively change. Suppose we had a new threshold τ', and we form the comparator:

$$\frac{|y(k) - y(k-L)|}{\sqrt{y(k)^2 + y(k-L)^2}} < \tau' \qquad \text{equation (1)}$$

where "y(i)" represents the value of sample i in the signal (where y(k) corresponds to the signal at 224 and y(k–L) corresponds to the delayed signal 228). This would be an excellent filter, and in fact is equal to the triple comparator with an adaptive threshold which we now show. A reason as to why this is a good detector is that the top term inside the absolute value is zero if we have no noise and two valid pulses. If we have pure noise then the denominator is an estimate of the noise standard deviation, and hence we have a test which is independent of noise variance [constant false alarm rate] and also gives 100% correct detection, 0% false alarms as the noise vanishes. This latter is called a consistent test in the statistics literature. Let us square both sides of the above expression. We obtain, when y(k)>y(k–L), letting $$\frac{y(k)}{y(k-L)} = \omega$$

after algebra:

$$\omega + \frac{1}{\omega} < \frac{2}{1-\tau'}$$

Since the left hand side is monotonic 0<ω<1, we can replace τ' with some other threshold and obtain ω<1 or y(k)<τy(k–L). We conclude that the detector in equation (1) is equivalent to the detector in FIG. 2D with the appropriate choice of τ', i. e. τ=f(τ'). It is intriguing to note we never need to actually find this function, and furthermore the flow in FIG. 2D is much less expensive computationally than forming the square roots and ratios and such in equation 1. It should be observed that equation (1) may, in another embodiment, be modified to include a running average of past τ to provide a more statistically stable estimate.

In this arrangement, Equation (1) the compute logic 350 in combination with the comparators 312 and 314 provides a funnel filter because the system permits the allowable drift to become wider as the signal-to-noise ratio (SNR) gets larger. The funnel filter provides a test statistic that allows explicit fast assessment of detection, leakage, and false alarm rates. Through Equation (1) above, the funnel filter employs τ', an adaptive value for τ. Thus the pulse collision filter depends only on the single threshold T. The motivation is that the use of Equation (1) for τ corresponds to allowing a drift of "a" standard deviations while still declaring signal presence. The axes y(k), y(k–L) are shown by 360 in FIG. 3B, and the shaded region in 360 is the region where we declare the valid code to be present. A false alarm occurs when "valid" is declared when the pulse is specious, or simply noise. This arises when we are inside the shaded region even though no valid pulse is present. A detection arises when we are in the shaded region when a signal is indeed present. Being in shaded region is unlikely for noise alone because it is unlikely that x and y will be close to each other by random chance. The shaded region in 360 is verified to have the described funnel form as follows, by reorganizing equation (1): 0<[y(k)²+y(k–L)²]+2y(k)y(k–L)/(τ'–1), τ"=1/(τ'–1) which is a sign indefinite quadratic form associated with the unitary operator:

$$\begin{bmatrix} 1 & \tau'' \\ \tau'' & 1 \end{bmatrix}$$

This then defines a funnel as evidenced by properties of conic sections. We only need 360 to determine how to set thresholds, and the circuit suffices to deliver our decision.

Figure 4:
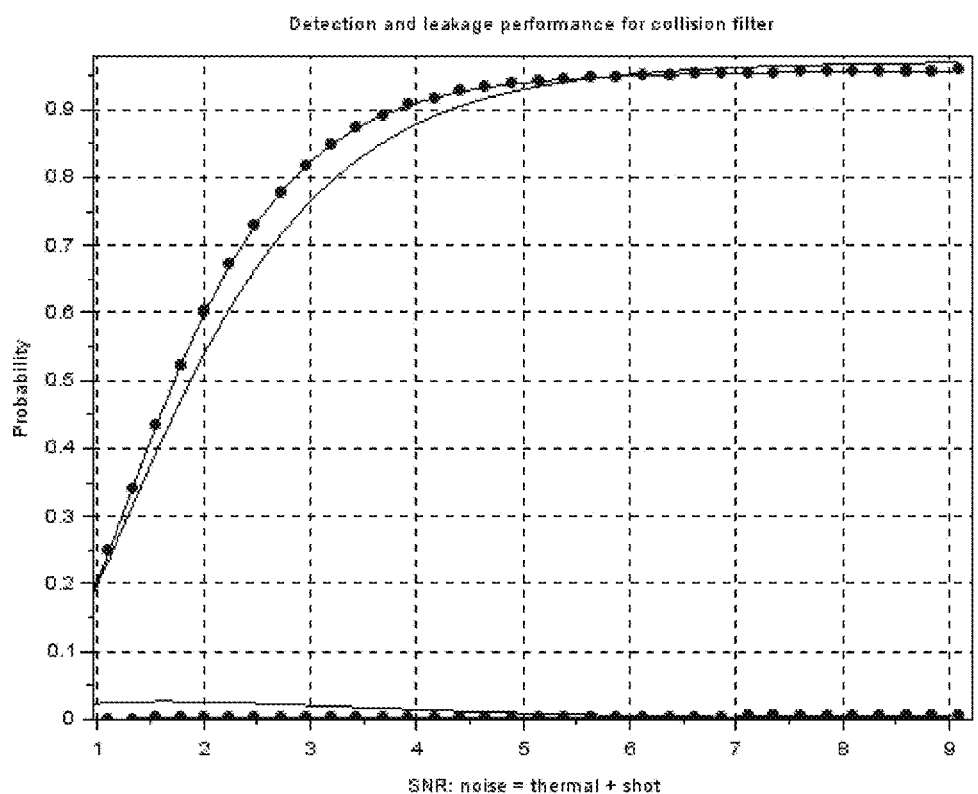
FIG. 4 shows a plot that measured filter performance in terms of detection probability versus SNR for doublets and triplets.

The false alarm rate, $P_{fa}$, required to set the threshold T, is shown in FIG. 3C. The detection probability, $P_d$, is used to tune laser power, or determine achievable range, as well as determining T to balance $P_d$, vs $P_{fa}$. The expression for $P_d$, is also shown in FIG. 3C, where Φ is the normal CDF, F the generalized hypergeometric function, I the modified Bessel function, $\delta = \sqrt{k^2+l^2}$, and λ, $\lambda_+$ are the mean signal level and the variance of the receiver respectively. Finally, the probabilities of a leaker (a falsely declared "own" pulse which is in fact an interfering pulse), $P_{leak}$, is shown by FIG. 3C. These formulations for $P_{leak}$ are approximations; the exact form can be found by deflating the summation limits in the formula for $P_d$. Also note that they are exact only for $N_{tuple}$ equals 2. FIG. 4 shows the (exact) detection performance for a doublet (solid line only) and triplet (line-dot) codes. The horizontal axis is the signal to noise ratio, including both thermal and shot noise, with thermal noise variance equal to the photon energy. For comparison the false alarm rate is 5e-5.

While the specific examples discussed above have involved the use of a delay code where the pulses are transmitted in relatively quick succession (and combined to form a pulse return if the decoder indicates that the code is in fact valid), it should be understood that longer pulse delays could be employed if desired by a practitioner.

As an example, one can consider a ladar system that is designed to send out a pulse every 10 usec. In such a case, a practitioner may use a code where the time between codes is a few tens of nanoseconds—for example, 7 nanoseconds. In so doing, the system would obtain a new target return, which can take the form of a new point in the ladar point cloud, every 10 usec. The system will have sent two pulses in rapid succession, and it will process the return with a very fast time delay to convert the return into a single target return. In other words, the system sends out, for a pulse doublet scenario, double the number of pulses as there are points in the point cloud that gets formed.

But, it is also possible to use a delay between 10 usec shots, and comparing results shot-to-shot. This has the advantage that the system produces one point in the point cloud for each laser shot taken. It also allows for more charge time between shots, thereby allows for increases to the shot energy. For an example where the system could have a laser shot at 0 usec and then again at 10.007 usec, and again at 20 usec and 20.007 usec, etc. The first two shots would then be used as the inputs in FIG. 2A (and subsequent figures). For example, in FIG. 2A, the even-indexed data returning from time shots at 0 usec, 20 usec, 40 usec, etc. could be fed into the bottom channel 224, and the odd-indexed data returning from time shots at 10.007 usec, 20.007 usec, etc. could be fed into the top channel 222. It should be understood that for cases where the range extent that the ladar system can "see" is less than about 660 meters, then the returns from the shot at 0 usec will die down before the shot at 10.007 usec is launched. This will help avoid ambiguity with respect to sorting out how to feed the return data into channels 222 and 224. This approach also relies on the maintenance of timing accuracy across pairs of shots, and in this regard, maintaining tens of nanoseconds of accuracy across tens of microseconds is expected to be well within the capabilities of currently available timing circuits given that timing circuits with clock drifts of one part in one billion are commercially available, whereas the proposed system here is more modest at roughly one part in one thousand.

Accordingly, it should be understood that the pulse coding, decoding, and performance modeling discussions herein can be applied to not only the short-delay embodiments discussed above but also this long-delay embodiment as well. The design tradeoff for a practitioner will be in choosing between and balancing laser hardware complexity (for short-delays) and digital memory (for long-delays).

Delay Code Selection:

Any of number of techniques can be used by practitioners to select the delay codes used by ladar systems in a manner that reduces the risks of the same ladar systems in a given area using the same delay codes for their ladar pulses.

For example, in several example embodiments, the delay codes can be selected in a non-collaborative/non-cooperative manner where different ladar systems need not have any knowledge of the how the other ladar systems select delay codes. This can be particularly useful in use cases involving vehicles such as automobiles because the reliability or availability of inter-vehicle communication to collaboratively define unique delay codes may not be practical. For example, with reference to FIG. 2A, we will want the delays L and M to be distinct so as to avoid pulse collisions where two nearby ladar systems are transmitting encoded ladar pulses with the same delays.

Figure 5:
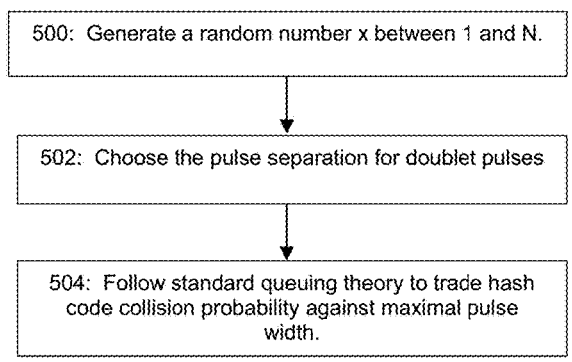
FIG. 5 shows an example process flow for generating delay codes using hashing techniques.

FIG. 5 shows an example of how hash codes to be used to generate delay codes with extremely low likelihoods of pulse collision. At step 500, a process generates a random number x that falls within the range between 1 and N, where N is the maximum-permitted delay (and where 1 in this example is the minimum-permitted delay). This random number can then be selected for the delay L between pulses (step 502). The hardware that generates the random number can be any processor or other circuitry suitable for such purposes. For example, many of embedded processors used in automotive industry already have random number generators in the library, which creates a robust set of options for hardware implementation. Example hardware for random number generation is available from many sources such as NVidia, Xilinx, Altera, etc. While FIG. 5 shows delay selection for a doublet embodiment, it should be understood that the process flow of FIG. 5 can run multiple times for n-tuple pulse encoding where n is greater than 2. For example, suppose we have N=6 [just like a single dice]. If we roll a 3, we use a doublet code spacing of 3. For a triplet code, suppose we roll the dice twice and get a 4, 6. Then our triplet code is three samples spaced by 4 and 6. It can be shown using introductory queuing theory that if two ladar systems, without any coordinating communication between them, randomly pick their own hash codes, the odds that they accidently choose the same code is 1 in $N^{-2}$. So for N=60 the odds are less than 0.05%. The elegance of hash codes is that no preparation whatsoever is required. One simply creates a hash code before any message is sent. That hash code is generated with a random number generator. The code can be retained until such a time that the performance is perceived to degrade (examples of which are discussed below), at which point the hash can be updated. Since the code is generated at random, the odds of two ladars choosing the same code is negligible. With reference to the example embodiment of the circuits shown in FIGS. 2A-C and 3A-B, it should be understood that the value of the delay imposed by the delay circuits can be adjustable to reflect the chosen hash codes.

Figure 6A:
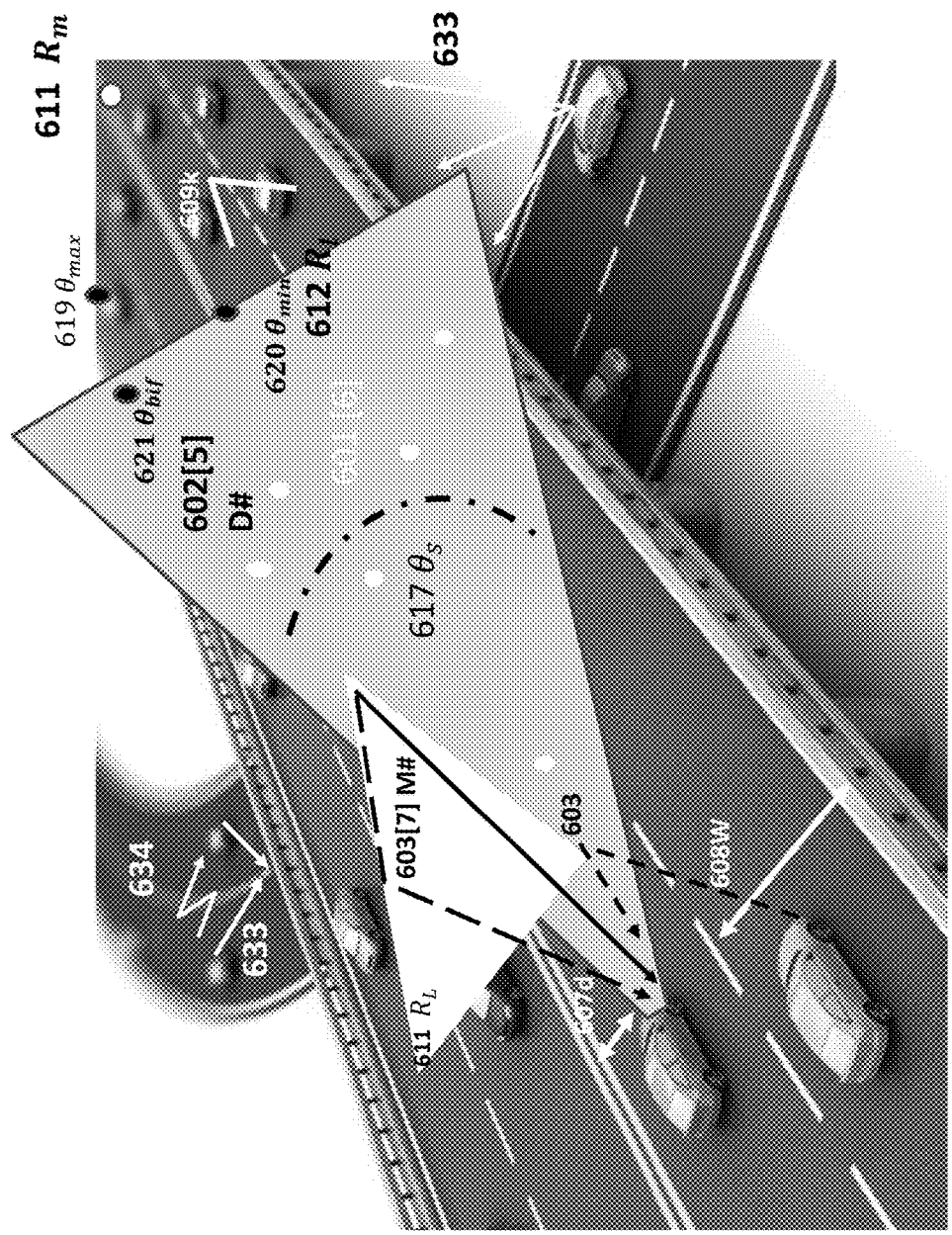

Further still, code assignments to ladar systems (such as vehicle code assignments in an automotive application) can be environmentally-dependent. FIGS. 6A and 6B show a scenario for developing a pulse collision performance model. 602 is a performance metric: D#, the rate of vehicles "blinded" by collision pulse, and 603 is another performance metric M#, the rate of vehicles where pulse collisions arise through multipath. Normally, as shown in FIG. 6A, the direct path (blinding) arises from pulses in the incoming lane. 629 in FIG. 6B shows the approximate formula for the total number of collisions. For example, using the $3^{rd}$ values in 615, 617, 618 in the table of FIG. 6B, and nominal values for other parameters in the table, we obtain 430 pulse collisions per second. Since we chose a demanding car density, this is conservative. We also assume every vehicle has a ladar system. We see that we have 2,400 pulse collisions per second. Thus, 12 bits of isolation suffices even in very dense environments. We can achieve this with some optical isolation. If we have 7 bits of optical isolation, we would need an additional 5 bits or an effective 32 codes in our hash table. One embodiment here would be a 1 ns pulse, dual pulse code spaced up to 0.1 us apart. This includes a margin for potential pulse spreading of about 3 nsec. In 0.1 us the two-way time of flight (range resolution) is 15 m. At 50,000 PRF this is also $\frac{1}{200}^{th}$ of a single range-gated PRF span, so we have ample margin.

In an example embodiment, position detection, such as geographical position detection, can be used to adjust and reset the delay codes used by a ladar system. For example, in a vehicle that is equipped with a GPS or other location-aware system, changes in the vehicle's detected geographic position can trigger adjustments/resets of the delay codes used by that vehicle's ladar system. In an example embodiment, the GPS position can be overlaid with a grid such as a pre-assigned grid of cellular regions to control delay code adjustments. As a vehicle approaches a new cellular region (and exits an old cell site), the vehicle's ladar system can be triggered to adjust/reset its delay code(s) (see FIG. 7). Such a design can allow for an efficient re-use of delay codes since a traffic monitoring system cam assess offline vehicle densities as well as line of site blinding conditions (RM) and configure delay code re-use to match the needs of the environment. Importantly, this can be achieved without the need for inter-vehicle communications during transit.

In another example embodiment, the signal processing circuit 300 of FIG. 3B can be used to extract the delay codes from signals that were rejected by the filter. Delay circuits with varying delays can be used as additional delay sum circuits to identify the delay codes that may be present in rejected interfering signals. This can be performed on randomized data subsets or it can be done for samples the exceed the T threshold set by comparator 234 but fail the tests defined by comparators 312 and 314. Moreover, this concept can be used with any n-tuple delay code. The procedure can be:

1) Count how often the first stage [screening] in FIG. 2D is triggered,
2) Count how often the probing stage rejects the pulse.
3) Apply the formulas in FIG. 3C to the results.
4) If the false alarms are larger than noise-only dictates, and the double and triple leaks are high, redo the hash codes, either in length or delay assignment.

In another example embodiment, vehicle-to-vehicle communication can be used to share codes and collaboratively adjust delay codes to avoid collisions (see FIG. 8).

In yet another example embodiment, the ladar systems can be used to communicate in a manner that exploits multipath off of pre-assigned structures at pre-assigned times. Through such an arrangement, the structures can be used as billboards to which ladar systems post their delay codes. (See FIG. 9).

In another example embodiment, the ladar systems can operate to non-cooperatively (or cooperatively via vehicle-to-vehicle communications) generate multi-static fused point clouds. With such an embodiment, pulse interference can be used with appropriate time transfer for multi-static ladar, thereby presenting detailed volumetric data from all ladar systems within view.

With a multi-static embodiment, one can assume a ladar system knows (1) the delay codes of all other ladar systems in the area, (2) the locations of the ladar systems in the area, and (3) the location of itself, and further assume that the other ladar systems have a clear line of sight to the subject ladar system's receiver. Therefore, if the subject receiver gets a return from a direct ladar pulse and an echo from that pulse (e.g., via the road or another car), the larger return will be the direct shot. It is expected that all of the shots will be clustered. For example, if Car A's ladar pulse bounces off Car B and then hits the subject receiver, and if Car A uses two pulses, the subject receiver will receive 110010 . . . 1001 (where each 1 is a pulse "bang" and each 0 is a non-pulse). The first two pulse bangs in this sequence are strong since they came straight from Car A to the subject receiver, and the subsequent pulse bangs will be echoes and hence weaker.

The subject ladar system then creates a pulse code receiver for each ladar system in the area through which it can detect every arrival time of the pulse doublet (or triplet) from every other ladar system. For each doublet (or triplet) pair that is received, the subject system can associate the largest return as the direct path and the smaller return with the echo. The system can then document the time differences between the direct returns and the echoes and combine this with the knowledge of where the subject ladar system is located and where the ladar system that sent the pulse bangs is located. This provides partial data on where the target producing the echo is located. Multi-static ladar in this context is a technical term describing the use of multiple variables in multiple equations to tease out target locations (point clouds) in this kind of situation.

In another example embodiment, the pulse detections (and any detections of interfering pulses) can be used to generate traffic flow information for use in traffic monitoring. The ladar-derived traffic information, for example, could be used to augment cellular phone-based crowdsource traffic data to aid traffic routing and the like. This information can be distributed in real time using vehicle-to-vehicle or other forms of communication. If the vehicle is in a communication-denied area during pulse collision, then information can be buffered and sent later with scenario-dependent latencies, similar to how cell phone fusion is practiced. FIG. 6A shows an example, 633/634 of inter vehicle communication. If vehicles share point clouds, or track files, during or after transit, the detail of traffic flow, including the influence of signage, or lack thereof, can provide a depth of insight for road architects and transportation planners that is unprecedented. Thus, the system can extract "digital exhaust" from pulse collision mitigation and derive system level benefits from these artifacts.

Circuits 220 and 300 can be implemented in any combination of electronics, circuitry, hardware, firmware, and/or software that a practitioner would find suitable. However, the inventor further notes that the elegant simplicity of circuits 220 and 300 allow for implementation using embedded processor such as a Xilinx Vertex, or Zync to yield real-time modes of operation. For example, a field programmable gate array (FPGA) can be used to provide the compute resources used by the circuits 220/300 for processing the samples of the receiver signal.

Furthermore, an FPGA-external SDRAM can be avoided using LVDS Parallel ADC, available from Analog devices and other vendors. This reduces latency and allows the FPGA (or other compute resource such as an ASIC) to dynamically adjust code block length, which can be used for rapid vehicle identifier and block length reassignment. Modern FPGA transceivers can easily ingest the 6.4 GSPS, which equates to an 8 bit 800 Mhz ADC, adequate for a 3 ns laser pulse (for example).

Furthermore, a FPGA with on-board ping pong memory and cascaded decimation using multiple DSP cores can provide high performance implementation of circuits 220/300. FIG. 10 shows the data flow for the case of 8 bits, 800 MHz ADC, with a triple pulse code, with maximum code delay length of 80 nsec. In this example embodiment the triple pulse code makes use of the pre-add in the Xilinx DSP48E1 core to implement the sparse delay sum in a single clock cycle in each DSP slice.

In another example embodiment, polarization and/or wavelength diversity can be used to create the delay code(s) used by a ladar system. If desired, a practitioner could operate with some or all portions of sparse codes in polarization of wave division space without absorbing temporal degrees of freedom. For example, consider a doublet code, with delay D, with a laser capable of operating at two frequencies/wavelengths F1 and F2. We can have four ladars use the exact same delay D, but not interfere. This can be accomplished by (1) using, for laser 1, F1 for first pulse and F2 for second pulse, and (2) using, for laser 2, F2 for first pulse and F1 for second pulse, and (3) using, for lasers 3, 4, F1 for both pulses and F2 for both pulses respectively. The use of these domains presents the practitioner with options for trading cost/performance in dense environments.

In other example embodiments, the pulse encoding and deconfliction techniques described herein can be used with transmitter/receiver systems other than ladar, for example radar systems, acoustic systems, ultrasound systems, or other active navigation aids. A sensor system which involves generating systems for environmental sensing which can potentially produce troublesome pulse collisions/interference could be benefited by the techniques described herein.

Figure 11:
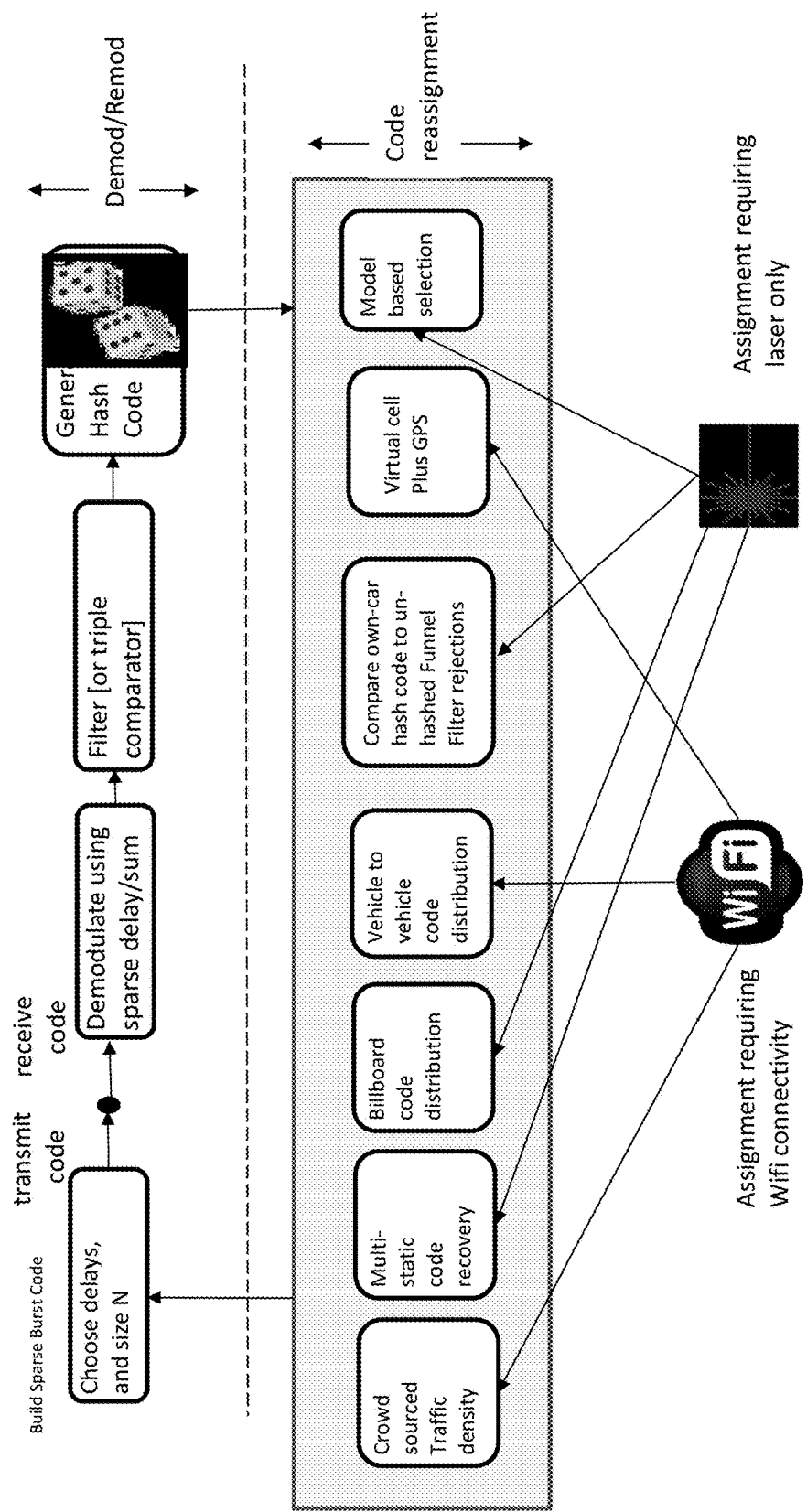
FIG. 11 shows various options for code assignment/re-assignment in combination with online transmit/receive/detect operations.

As a summary, FIG. 11 shows various options for code assignment/re-assignment in combination with online transmit/receive/detect operations. The code generation transmission and reception is shown above the dotted line. Below the dotted line are the code assignment and reassignment operations. Code assignment/reassignment operations that are built and based on the own-car's ladar system (indicated by the laser symbol), and those requiring some means of exterior communication (indicated by the Wi-Fi symbol) are so noted in FIG. 11. It should be understood that the Wi-Fi communications do not require closed loop real time connectivity. The degree of latency tolerated can vary based on applicable circumstances (e.g., to update codes as new vehicles enter own-car's field of view versus a need to update factory setting if virtual cells need reconfiguring).

Data Communication:

In another example embodiment, the inventors disclose that the ladar system can also be configured to transmit, receive, and/or transceive data via optical communications. The ability to receive and/or send information other than range point detection data optically via the technology disclosed herein can improve the overall situational awareness for a ladar system (including for a vehicle on which the ladar system may be deployed). By using optical communications via the ladar system, practitioners can communicate information using a communication channel that is already available and (unlike WiFi communications, cellular communications, and/or satellite communications, does not compete with congested bandwidth on such channels).

However, the use of laser as a means of communication is expected to involve relatively consistent laser dosage in certain locations, which places a premium on monitoring and control of laser dosage. Toward this end, the inventors disclose techniques for laser dosage control with respect to laser-based data communications. Such dosage control is helpful for both laser eye safety and avoiding camera damage. For example, it has been well-documented that consistent camera exposure at very short distances (e.g., 2 feet or so) to a laser source that is eye-safe (e.g., class 1) can cause flashing in the camera; and at even closer ranges (e.g., 6 inches for 10 uJ lasers or 2 inches for 1 uJ lasers)—or with a telephoto lens—pixel damage can occur. This is not expected to be a problem when a ladar system used for optical data communication is installed in a vehicle and the vehicle is in motion; but when the vehicle is stopped at intersections, the laser dosage to specific locations can be expected to be higher (and the presence of cameras at intersections can also be expected). There are various applications which are available for detecting the presence of a camera using a video imager (see, for example, the "Spy hidden camera Detector" available from Asher L. Poretz in the Apple App Store). Discussed below are calculations and controls that can be used as part of the system for purposes of hum eye safety as well as camera damage avoidance.

Figure 12:
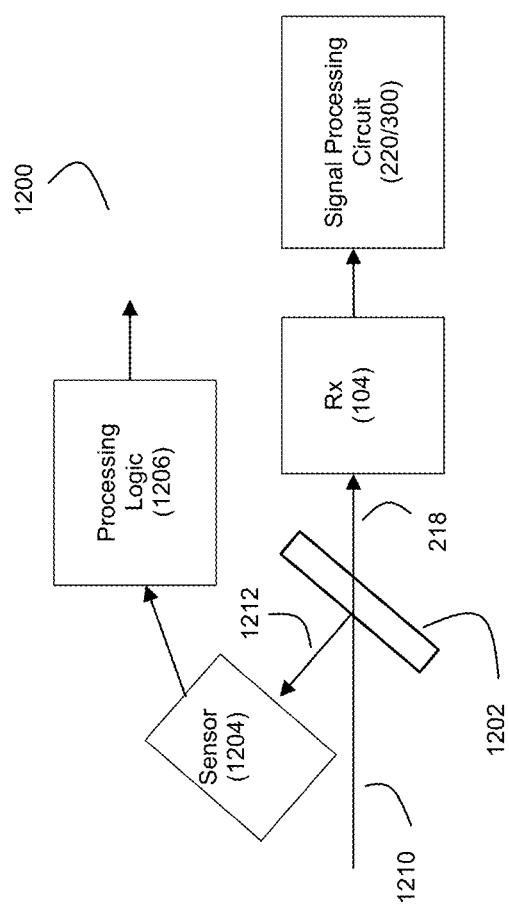
FIG. 12 shows an example embodiment of a ladar receiver augmented to also receive other optical information.

FIG. 12 depicts an example embodiment of an optical receiver 1200 that can receive and process not only ladar pulse returns as discussed above but also receive and process other optical information. The optical receiver 1200 can include a ladar receiver 104 and signal processing circuit 220 or 300 as discussed above. However, the optical receiver 1200 can also include a beam splitter 1202 positioned optically upstream from the ladar receiver 104. The beam splitter 1202 can be configured to controllably split incident light 1210 based on the frequency/wavelength of the incident light. Incident light 1210 that has a frequency or wavelength in a range of frequencies/wavelengths expected for ladar pulse returns 218 can be directed to the ladar receiver 104, and incident light 1210 that has a frequency or wavelength in a range of frequencies/wavelengths not expected for ladar pulse returns 218 can be directed to the sensor 1204. This allows the beam splitter to re-direct light 1212 to the sensor 1204. Thus, light 1212 can be used as a source of information for the optical receiver 1200. Processing logic 1206 can process this light 1212 as detected by sensor 1204 to determine information about the field of view visible to the ladar receiver 104. The sensor 1204 can be co-bore sited with the ladar receiver 104, which means that the sensor 1204 would be looking at the same scene as the ladar receiver 104.

As an example, sensor 1204 can be a camera that receives and processes light in the visible spectrum. This allows the processing logic 1206 to process image data produced by the camera and locate items of interest in the image data. The ability to detect such items can be useful for enhancing the situational awareness of the system in which the optical receiver 1200 is deployed (such as a vehicle). For example, the processing logic 1206 can use image analysis and object recognition to detect the presence of another vehicle within the image data (or even the location of another optical receiver 1200 on the another vehicle). As discussed below in connection with the transceiver embodiment of FIG. 13, messages could then be targeted at this detected vehicle using the targeting capabilities of ladar transmitter 102.

Message information can be encoded in laser pulses using delays, and the receiver can measure these delays as part of the processing in FIG. 2C. If the pulse delay is not the code used by the host laser, then the pulse pair can be rejected. Through the use of a communication protocol such as header message formats, the receiver will be able to know that a message is being sent. As an example, suppose the source laser uses a delay of "a" seconds for sending a "0" bit and a delay of "b" seconds for sending a "1" bit. Then, the source laser can send a group of pulses all with the delay "a", then another group of pulses all with delay "b". The receiver then observes a repeat transmission which tells it that there is a code from a single source laser because a plurality of source lasers sending messages would not provide repeat transmissions. Hence, the receiver knows that (i) another system is trying to communicate, and (ii) the communication code is being shared through redundancy. Once sufficient repeats have been sent out, the sending laser can now send information using the code book [e.g., "a" delays for "0", "b" delays for "1"] that the receiver now possesses.

A benefit of bore siting the camera with the ladar receiver 104 is that this avoids disruptive parallax (at least on the receive side) between the active laser and passive optics, which allows for precise control of a targeted laser. While of value for forming laser point clouds, this precision of control is also of great practical value in using the ladar transmitter 102 as a communication source because it allows the passive video optics to find the exact location of the other vehicle's receiver (and then quickly transmit data at that location by firing its laser). A second video camera can also be used, with the stereo vision providing additional localization acuity.

Figure 13:
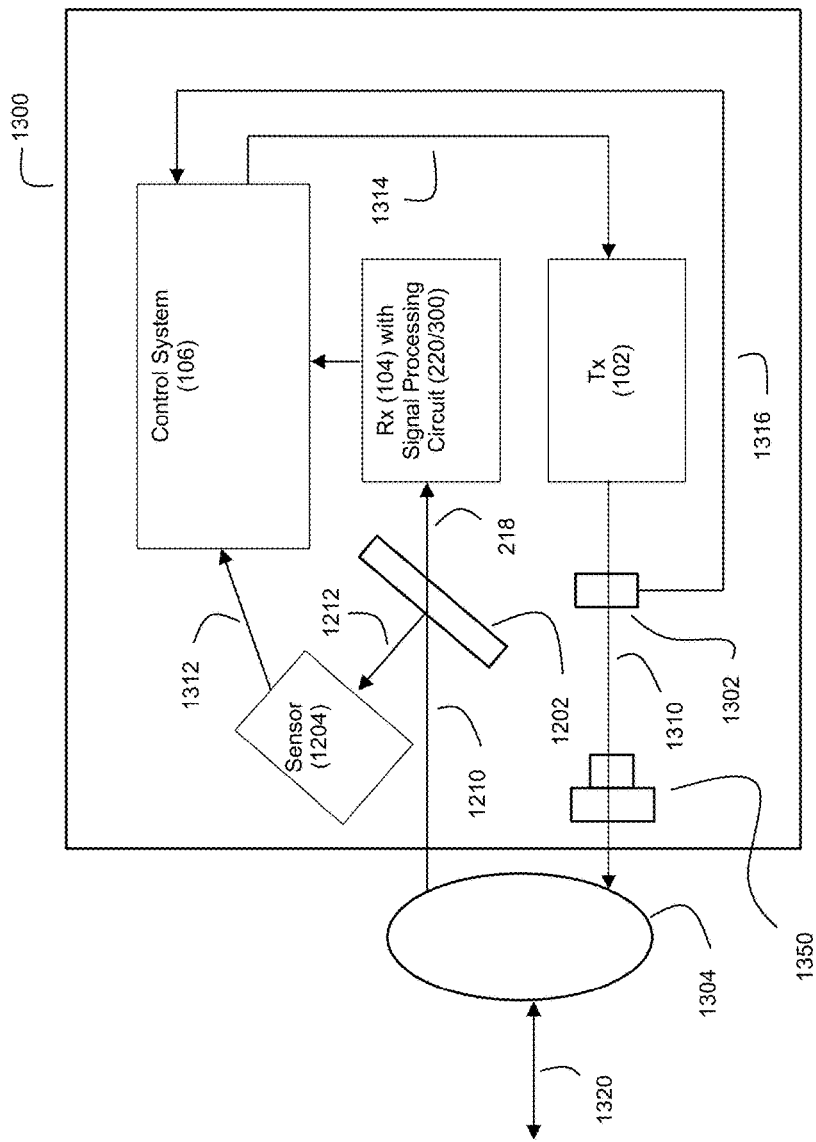
FIG. 13 shows an example embodiment of an optical transceiver that can serve as a free space, point-to-point optical data communication system.

To further reduce the risk of node-to-node interference, a telescoping lens can be included in a transmit path for the system (see 1350 in FIG. 13). The telescoping lens 13*xx* permits the system to target light on the intended optical collector, even over larger distances, by adjusting the beam divergence to match the size of the receiver's photodetector.

FIG. 13 shows an example optical transceiver 1300 that employs a ladar transmitter 102 and ladar receiver 104, and is capable of receiving information optically as discussed above in connection with FIG. 12. The transceiver 1300 includes a sensor 1302 that is positioned to sense and pass light 1310 sent by the ladar transmitter 102. This light 1310 may comprise ladar pulses 110 as discussed above, but it could also comprise other forms of light that are meant to convey information optically, such as a probing message or the like.

In an environment where multiple optical transceivers 1300 are deployed on multiple vehicles that are within the vicinity of each other, the optical transceivers 1300 can leverage the data communication techniques described herein to achieve targeted point-to-point communications between specific vehicles. The targeted point-to-point nature of this communication can be understood when considering that the size of an example laser with a nominal beam divergence of 3 mrad is only about 6 inches in diameter at 50 m. Therefore, the optical transceiver 1300 can be configured to selectively illuminate relatively small areas within which a targeted optical receiver is located. This can be contrasted with communications over a cellular network where every receiver within a network cell will be bathed in radiofrequency energy.

Heat Map Analysis and Control:

Sensor 1302 can help the transceiver 1300 maintain eye safety during optical transmissions. For example, to maintain connectivity in a free space link when the transmitter is used in a free space, point-to-point optical data communication system, there is a possibility that a heavy dosage of light will be directed at a specific location. If left unchecked, this could pose eye safety concerns. Moreover, such risk could be heightened in example embodiments where a telescoping lens 1350 is employed because the telescoping lens 1350 can reduce beam divergence which therefore might increase the energy that could enter the pupil of a person who happened to be positioned in the line of sight between the optical transmitter and the optical receiver. This use as a free space, point-to-point optical data communication system stands in contrast to use as a scanning ladar transmitter where the laser light is expected to constantly scan which will dilute the optical dose at any fixed location. Thus, the sensor 1302 can help maintain eye safety by working in concert with control system 106 by maintaining a heat map or running tally of the last dosage delivered to locations within the field of view.

FIG. 14A illustrates an example of how a heat map control process can be implemented. The control process can begin with an initialization of the heat map. The heat map can have rows and columns that correspond to the achievable azimuth and elevation laser shot locations. This heat map can be accessible to the scheduler for the ladar transmitter. At initiation, the system can set the heat map to zero, and it can also set the maximum allowed dosage (md). The value for md in an example can be set arbitrarily at 20 units. The control process then loops through all scheduled shots. As an example, laser shots may arise on the order of microseconds spacing, so a queue depth of hundreds of shots may be used to help avoid race conditions while presenting minimal latency impact.

At time K, the system inspects the next scheduled shot, and the system also inspects the current heat map as well as the energy planned for the next scheduled shot. In the running example, at time K, the associated Kth scheduled shot will be fired at row 2, column 1, with a scheduled shot energy of 8 units of energy. The system can then compute the next heat map entry at the heat map element corresponding to row 2, column 1 as 10+8=18. This is less than the maximum dosage (md) of 20 units, so the system can take the scheduled laser shot. If instead the scheduled shot energy was 11 units, this means that the system would need to delay the shot or reduce the shot energy.

As additional comments on the heat map control features, the inventors note that the azimuth and beam locations in this example embodiment are not corresponding to fixed physical locations when the vehicle is moving. Further they do not correspond to the time varying position of eye position for moving observers. Currently international laser eye safety regulations do not address the problem of accounting for both own-car motion as well as that of other observers or vehicles in constructing dosage models. However, anticipating evolutions in laser eye safety standards as technology evolves and markets expand, the inventors posit that such additions might be desired and can be implemented using techniques described herein. The current eye safety standards specify a distance of 10 cm for 10 mw, and at such ranges the relative motion between observer and laser is a moot point. To implement observer relative motion, for moving vehicle and fixed observers, the system could use a map, and convert azimuth and elevation to map locations.

The inventors further note that the heat map matrix is expected to be generally large, for example an array of over 10,000 entries. However, this is well within the scope of many existing commercially available processors for maintaining real time heat map management and control.

Also, while the maximum dosage (md) used in the example discussed above is a static value, it should be understood that the system could employ a variable maximum dosage. For example, the maximum dosage can be adjusted for the presence of a camera. Given that it is expected that the camera will need to very close to the laser for the laser to present a hazard to the camera, this may be a risk that is largely confined to dense urban environments while a vehicle is parked.

The control system 106 can use the heat map to constrain the shot list used by the ladar transmitter 102 when firing the laser. If a particular destination location is getting too close to being overly dosed with light as determined from the heat map, the shot list delivered to the ladar transmitter 102 can be adjusted to remove shots that would target that particular destination location for a specified window of time (or reduce the shot energy if possible). For example, it may be desirable to ensure that no more than 10 mw of laser light enters a human pupil over a 1 second interval. This means that a 1 W laser can likely only operate as a free space optical communication transmitter to a targeted reception location over a 1 sec interval using 1% of net energy (since 10 mW is 1% of 1 W).

Thus, the optical transceiver 1300 can operate in both a ladar mode and a free space optical communication mode. When operating in the ladar mode, the transceiver 1300 can transmit and receive ladar pulses as discussed above to determine range information for objects within the system's field of view. When operating in the free space optical communication mode, the transceiver 1300 can receive optical information via the path through the beam splitter 1202 and sensor 1204, and the transceiver can also send optical information via the ladar transmitter 102 (or other light source if desired).

Control system 106 can translate range points into a shot list as described in the above-referenced and incorporated patent applications, and the ladar transmitter 102 can use this shot list to target ladar pulses using a beam scanner and compressive sensing as described in the above-referenced and incorporated patent applications. The ladar transmitter 102 can either share the same lens as the ladar receiver 104 (in which case polarized light can be used) or be located in proximity of the ladar receiver 104.

Light 1320 is light from another ladar system that, like the laser source 1310 from the ladar system in FIG. 13 encompassed by the box 1300, is incident on optical detector 1304. This light is commingled with light 1310 and both are passed to the beam splitter 1202 (see light 1210), which in turn re-directs this light to the sensor 1204 if the light 1210 exhibits a frequency meant to be used for optical communications. Data such as image data from sensor 1204 can be passed to the control system 106 via data link 1312, and the processing logic 1206 discussed above in connection with FIG. 12 can be embedded into the control system 106. Thus, control system 106 can process the information on link 1312 to locate objects of interest in the transceiver's field of view such as an optical receiver on a vehicle or other object (e.g., a fixed item of infrastructure such as a traffic sign, cell tower, etc.). The control system 106 can also determine a location for the object of interest, such as the azimuth and elevation orientation of the object of interest. If the control system 106 decides that the object of interest should be targeted with a ladar pulse 110 or an optical message of some sort, it can insert a range point into the shot list that is targeted to the determined location of the object of interest.

Meanwhile, sensor 1302 can be sensing and tracking the amount of transmitted light 1310, and this dosage information can be fed back to the control system 106 via data link 1316 so that the control system 106 can maintain and update the heat map which tracks light dosage per location over time. Given that the control system 106 can know where the ladar transmitter 102 is targeted at any given time, this information can be correlated with the sensed dosage information in link 1316 to build and update the heat map. The control system 106 can then use this heat map to modify the shot list (and/or reduce shot energy) as needed to prevent a particular location from being dosed with too much light over a specified window. Thus, the heat map can be used to decide whether a scheduled shot from the shot list should be canceled, re-scheduled, and/or have its shot energy reduced. In FIG. 14A, no window is shown; but the system can convert a constantly growing heat map with a running average by subtracting older data from the heat map. This can be done by replacing the update step for the heat map from FIG. 14A with a new update scheme as shown by FIG. 14B, where m is the duration of the running window.

Furthermore, the system can also exercise control to selectively avoid firing laser shots at specific locations. These specific locations can be referred to as "keep away" locations. With reference to FIGS. 12 and 13, the sensor 1204 and processing logic 1206 can cooperate to identify elements in the environmental scene that correspond to designated objects that a practitioner wants to avoid dosing with laser light. For example, processing can be performed on data produced by sensor 1204 to identify objects such as cameras, human faces, strong retro-reflectors, other ladar receivers not disposed from cross-communication, and free space optical nodes. Image processing and pattern matching classification techniques can be used to detect such objects of interest. Upon identifying such objects and determining their locations (e.g., azimuth and elevation locations) in the environmental scene, these locations can be designated as "keep away" locations in the heat map. In this fashion, if the system encounters a shot on the shot list that is targeted to such a "keep away" location, the system can then consult the heat map to conclude that such a location should not be targeted with a ladar pulse and adjust the shot list accordingly. The heat map can indicate such "keep away" locations via any of a number of techniques. For example, the "keep away" locations can have their heat map data values adjusted to match or exceed the maximum dosage, in which case the system will avoid firing laser shots at such locations. As another example, the heat map data structure can include a separate flag for each indexed location to identify whether that location is a "keep away" location. As yet another example, the heat map data structure can comprise two independent data structures, one that tracks dosage over time for the various locations and one that identifies keep away locations over time.

An optical transceiver 1300 can thus communicate bidirectionally over free space 1320 to not only perform range point detection and measurement but also communicate data optically. As an example, such data communications can used by vehicles to share delay codes to reduce the potential for interference within a given environment. However, it should be understood that other information could be shared as well, such as traffic data, ladar point clouds, text messages, etc., with the imagination of a practitioner and tolerable latency being the only constraints.

While the invention has been described above in relation to its example embodiments, various modifications may be made thereto that still fall within the invention's scope. Such modifications to the invention will be recognizable upon review of the teachings herein.

What is claimed is:

1. An apparatus comprising:
   a ladar receiver that includes a pulse deconfliction circuit, wherein the pulse deconfliction circuit uses delays between pulses to distinguish between own pulse reflections and interference;
   wherein the pulse deconfliction circuit comprises a sparse delay sum circuit configured to detect own pulse reflections from doublet pulses having a known delay between pulses;
   wherein the sparse delay sum circuit comprises:
      a delay circuit configured to delay a received signal by the known delay to generate a delayed signal;
      an adder configured to sum the received signal with the delayed signal to generate a delay sum signal;
      a comparator configured to compare the delay sum signal with a controllable threshold;
      logic configured to determine whether the delay sum signal includes an own pulse reflection based on the threshold comparison; and
      a register configured to store the controllable threshold; and
      wherein the comparator is configured to read the controllable threshold from the register.

2. The apparatus of claim 1 wherein the sparse delay sum circuit further comprises:
   compute logic configured controllably adjust the controllable threshold in the register based on a statistical analysis of the received signal.

3. An apparatus comprising:
   a ladar receiver that includes a pulse deconfliction circuit, wherein the pulse deconfliction circuit uses delays between pulses to distinguish between own pulse reflections and interference;
   wherein the pulse deconfliction circuit comprises a sparse delay sum circuit configured to detect own pulse reflections from doublet pulses having a known delay between pulses;

wherein the sparse delay sum circuit comprises:
  a delay circuit configured to delay a received signal by the known delay to generate a delayed signal;
  an adder configured to sum the received signal with the delayed signal to generate a delay sum signal;
  a comparator configured to compare the delay sum signal with a controllable threshold; and
  logic configured to determine whether the delay sum signal includes an own pulse reflection based on the threshold comparison; and
wherein the pulse deconfliction circuit is further configured to controllably adjust the known delay used by the delay circuit.

4. The apparatus of claim 3 wherein the pulse deconfliction circuit is further configured to controllably adjust the known delay used by the delay circuit based on a determined location for the ladar receiver.

5. The apparatus of claim 4 wherein the determined location comprises a cellular region.

6. An apparatus comprising:
a ladar receiver that includes a pulse deconfliction circuit, wherein the pulse deconfliction circuit uses delays between pulses to distinguish between own pulse reflections and interference;
wherein the pulse deconfliction circuit comprises a sparse delay sum circuit configured to detect own pulse reflections from doublet pulses having a known delay between pulses;
wherein the sparse delay sum circuit comprises:
  a delay circuit configured to delay a received signal by the known delay to generate a delayed signal;
  an adder configured to sum the received signal with the delayed signal to generate a delay sum signal;
  a comparator configured to compare the delay sum signal with a controllable threshold; and
  logic configured to determine whether the delay sum signal includes an own pulse reflection based on the threshold comparison; and
wherein the pulse deconfliction circuit is further configured to select the known delay used by the delay circuit based on hashing.

7. An apparatus 1 comprising:
a ladar receiver that includes a pulse deconfliction circuit, wherein the pulse deconfliction circuit uses delays between pulses to distinguish between own pulse reflections and interference;
wherein the pulse deconfliction circuit comprises a sparse delay sum circuit configured to detect own pulse reflections from doublet pulses having a known delay between pulses;
wherein the sparse delay sum circuit comprises:
  a delay circuit configured to delay a received signal by the known delay to generate a delayed signal;
  an adder configured to sum the received signal with the delayed signal to generate a delay sum signal;
  a comparator configured to compare the delay sum signal with a controllable threshold; and
  logic configured to determine whether the delay sum signal includes an own pulse reflection based on the threshold comparison; and
wherein the pulse deconfliction circuit is further configured to select the known delay used by the delay circuit based on a collaboration with a plurality of other ladar systems.

8. An apparatus comprising:
a ladar receiver that includes a pulse deconfliction circuit, wherein the pulse deconfliction circuit uses delays between pulses to distinguish between own pulse reflections and interference;
wherein the pulse deconfliction circuit comprises a sparse delay sum circuit configured to detect own pulse reflections from doublet pulses having a known delay between pulses;
wherein the sparse delay sum circuit comprises:
  a delay circuit configured to delay a received signal by the known delay to generate a delayed signal;
  an adder configured to sum the received signal with the delayed signal to generate a delay sum signal;
  a comparator configured to compare the delay sum signal with a controllable threshold; and
  logic configured to determine whether the delay sum signal includes an own pulse reflection based on the threshold comparison; and
wherein the pulse deconfliction circuit is further configured to select the known delay used by the delay circuit based on a posting by an electronic billboard.

9. An apparatus comprising:
a ladar receiver that includes a pulse deconfliction circuit, wherein the pulse deconfliction circuit uses delays between pulses to distinguish between own pulse reflections and interference;
wherein the pulse deconfliction circuit comprises a cascaded sparse delay sum circuit that is configured to detect own pulse reflections from triplet pulses having known delays between pulses;
wherein the cascaded sparse delay sum circuit comprises:
  a first delay circuit and a second delay circuit in series, the first delay circuit configured to delay a received signal by a first delay to generate a first delayed signal, the second delay circuit configured to delay the first delayed signal by a second delay to generate a second delayed signal, wherein the first and second delays correspond to the known delays;
  a first adder configured to tap into the first delayed signal and sum the received signal with the first delayed signal to generate a first delay sum signal;
  a second adder configured to tap into the second delayed signal and sum the first delay sum signal with the second delayed signal to generate a second delay sum signal;
  a comparator configured to compare the second delay sum signal with a controllable threshold; and
  logic configured to determine whether the second delay sum signal includes an own pulse reflection based on the threshold comparison.

10. The apparatus of claim 9 wherein the first and second delays are different delays.

11. The apparatus of claim 9 wherein the first and second delays are the same delay.

12. The apparatus of claim 9 wherein the sparse delay sum circuit further comprises:
a register configured to store the controllable threshold; and
wherein the comparator is configured to read the controllable threshold from the register.

13. The apparatus of claim 12 wherein the sparse delay sum circuit further comprises:
compute logic configured controllably adjust the controllable threshold in the register based on a statistical analysis of the received signal.

14. The apparatus of claim 9 wherein the pulse deconfliction circuit is further configured to controllably adjust the first and second delays used by the first and second delay circuits.

15. An apparatus comprising:
a ladar receiver that includes a pulse deconfliction circuit, wherein the pulse deconfliction circuit uses delays between pulses to distinguish between own pulse reflections and interference;
wherein the pulse deconfliction circuit comprises a cascaded sparse delay sum circuit that is configured to detect own pulse reflections from n-tuple pulses having known delays between pulses, wherein n is greater than 2;
wherein the cascaded sparse delay circuit comprises:
  a plurality n of delay circuits in series, each delay circuit configured to delay a received signal by a different one of the known delays to generate a corresponding delayed signal;
  a plurality n of adders in series, wherein a first adder in the series is configured to tap into a first corresponding delayed signal in the series and sum the received signal with the first corresponding delayed signal to generate a first delay sum signal, and wherein the subsequent adders in the series are configured to tap into corresponding delayed signals in the series and sum the corresponding delayed signal with the sum produced by the previous adder in the series;
  a comparator configured to compare the sum from the n-th adder in the series with a controllable threshold; and
  logic configured to determine whether the sum from the n-th adder in the series includes an own pulse reflection based on the threshold comparison.

16. The apparatus of claim 15 wherein the known delays between pulses comprise a plurality of different delays between at least a plurality of the pulses.

17. The apparatus of claim 15 wherein the known delays between pulses are the same delay between pulses.

18. An apparatus comprising:
a ladar receiver that includes a pulse deconfliction circuit, wherein the pulse deconfliction circuit uses delays between pulses to distinguish between own pulse reflections and interference; and
wherein the pulse deconfliction circuit comprises a triple comparator circuit, the triple comparator circuit configured to find an own pulse reflection in a received signal in response to (1) a sum of candidate pulse pairs having a magnitude in excess of a first threshold based on a first comparison operation, and (2) an inter-pulse deviation between candidate pulse pairs having a deviation less than a second threshold based on second and third comparison operations.

19. The apparatus of claim 18 wherein the triple comparator circuit comprises a sparse delay sum circuit configured to perform the first comparison operation.

20. The apparatus of claim 19 wherein the triple comparator circuit further comprises:
a first multiplier configured to multiply the received signal with the second threshold to generate a first product;
a first comparator configured to compare a delayed version of the received signal with the first product;
a second multiplier configured to multiply the delayed version of the received signal with the second threshold to generate a second product;
a first comparator configured to compare the received signal with the second product;
logic configured to detect the own pulse reflection based on results from the sparse delay sum circuit, the first comparator, and the second comparator.

21. The apparatus of claim 18 wherein the pulse deconfliction circuit is further configured to controllably adjust the second threshold based on the received signal and a delayed version of the received signal.

22. The apparatus of claim 1 wherein the ladar receiver includes a field programmable gate array (FPGA) on which the pulse deconfliction circuit is deployed.

23. The apparatus of claim 1 wherein the ladar receiver receives own pulse reflections that are spaced in a sequence of shorter delays between pulse pairs and longer delays between the pulse pairs with the shorter delays.

24. An apparatus comprising:
a ladar receiver that includes a pulse deconfliction circuit, wherein the pulse deconfliction circuit uses delays between pulses to distinguish between own pulse reflections and interference;
wherein the ladar receiver receives own pulse reflections that are spaced in a sequence of shorter delays between pulse pairs and longer delays between the pulse pairs with the shorter delays; and
wherein the pulse deconfliction circuit is further configured to process incoming pulse reflections such that a first set of incoming pulse reflections are processed through a delay path and a second set of incoming pulse reflections are processed through a non-delayed path.

25. The apparatus of claim 3 wherein the ladar receiver includes a field programmable gate array (FPGA) on which the pulse deconfliction circuit is deployed.

26. The apparatus of claim 3 wherein the ladar receiver receives own pulse reflections that are spaced in a sequence of shorter delays between pulse pairs and longer delays between the pulse pairs with the shorter delays.

27. The apparatus of claim 6 wherein the ladar receiver includes a field programmable gate array (FPGA) on which the pulse deconfliction circuit is deployed.

28. The apparatus of claim 6 wherein the ladar receiver receives own pulse reflections that are spaced in a sequence of shorter delays between pulse pairs and longer delays between the pulse pairs with the shorter delays.

29. The apparatus of claim 7 wherein the ladar receiver includes a field programmable gate array (FPGA) on which the pulse deconfliction circuit is deployed.

30. The apparatus of claim 7 wherein the ladar receiver receives own pulse reflections that are spaced in a sequence of shorter delays between pulse pairs and longer delays between the pulse pairs with the shorter delays.

31. The apparatus of claim 8 wherein the ladar receiver includes a field programmable gate array (FPGA) on which the pulse deconfliction circuit is deployed.

32. The apparatus of claim 8 wherein the ladar receiver receives own pulse reflections that are spaced in a sequence of shorter delays between pulse pairs and longer delays between the pulse pairs with the shorter delays.

33. The apparatus of claim 9 wherein the ladar receiver includes a field programmable gate array (FPGA) on which the pulse deconfliction circuit is deployed.

34. The apparatus of claim 9 wherein the ladar receiver receives own pulse reflections that are spaced in a sequence of shorter delays between pulse pairs and longer delays between the pulse pairs with the shorter delays.

35. The apparatus of claim 15 wherein the ladar receiver includes a field programmable gate array (FPGA) on which the pulse deconfliction circuit is deployed.

36. The apparatus of claim 15 wherein the ladar receiver receives own pulse reflections that are spaced in a sequence of shorter delays between pulse pairs and longer delays between the pulse pairs with the shorter delays.

37. The apparatus of claim 18 wherein the ladar receiver includes a field programmable gate array (FPGA) on which the pulse deconfliction circuit is deployed.

38. The apparatus of claim 18 wherein the ladar receiver receives own pulse reflections that are spaced in a sequence of shorter delays between pulse pairs and longer delays between the pulse pairs with the shorter delays.

39. The apparatus of claim 24 wherein the ladar receiver includes a field programmable gate array (FPGA) on which the pulse deconfliction circuit is deployed.

40. The apparatus of claim 24 wherein the ladar receiver receives own pulse reflections that are spaced in a sequence of shorter delays between pulse pairs and longer delays between the pulse pairs with the shorter delays.

41. The apparatus of claim 24 wherein the pulse deconfliction circuit comprises a sparse delay sum circuit.

42. The apparatus of claim 24 wherein the sparse delay sum circuit is configured to detect own pulse reflections from doublet pulses having a known delay between pulses.

43. The apparatus of claim 42 wherein the sparse delay sum circuit comprises:
    a delay circuit configured to delay a received signal by the known delay to generate a delayed signal;
    an adder configured to sum the received signal with the delayed signal to generate a delay sum signal;
    a comparator configured to compare the delay sum signal with a controllable threshold; and
    logic configured to determine whether the delay sum signal includes an own pulse reflection based on the threshold comparison.

44. The apparatus of claim 24 wherein the sparse delay sum circuit comprises a cascaded sparse delay sum circuit that is configured to detect own pulse reflections from triplet pulses having known delays between pulses.

45. The apparatus of claim 24 wherein the sparse delay sum circuit comprises a cascaded sparse delay sum circuit that is configured to detect own pulse reflections from n-tuple pulses having known delays between pulses, wherein n is greater than 2.

46. The apparatus of claim 45 wherein the known delays between pulses comprise a plurality of different delays between at least a plurality of the pulses.

47. The apparatus of claim 45 wherein the known delays between pulses are the same delay between pulses.

* * * * *